(12) United States Patent
Kim et al.

(10) Patent No.: US 12,261,802 B2
(45) Date of Patent: Mar. 25, 2025

(54) METHOD FOR TRANSMITTING/RECEIVING PDSCH IN WIRELESS COMMUNICATION SYSTEM, AND DEVICE THEREFOR

(71) Applicant: LG ELECTRONIC INC., Seoul (KR)

(72) Inventors: Kyuseok Kim, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 355 days.

(21) Appl. No.: 17/765,683

(22) PCT Filed: Oct. 5, 2020

(86) PCT No.: PCT/KR2020/013517
§ 371 (c)(1),
(2) Date: Mar. 31, 2022

(87) PCT Pub. No.: WO2021/066631
PCT Pub. Date: Apr. 8, 2021

(65) Prior Publication Data
US 2022/0393829 A1    Dec. 8, 2022

(30) Foreign Application Priority Data
Oct. 4, 2019 (KR) .......................... 10-2019-0123423

(51) Int. Cl.
*H04L 5/00* (2006.01)
*H04W 72/23* (2023.01)

(52) U.S. Cl.
CPC ........... *H04L 5/0053* (2013.01); *H04W 72/23* (2023.01)

(58) Field of Classification Search
CPC .. H04B 7/024; H04B 7/06; H04L 1/18; H04L 5/0032; H04L 5/0053; H04L 5/0094; H04W 72/11; H04W 72/23
See application file for complete search history.

(56) References Cited

U.S. PATENT DOCUMENTS 9,591,545 B2    3/2017 Tamura et al.
10,382,170 B2 *  8/2019 Babaei .................. H04L 1/1822
(Continued)

FOREIGN PATENT DOCUMENTS

WO    2019/028276 A1    2/2019

OTHER PUBLICATIONS

Vivo, "Remaining Issues on Multi-TRP/Panel Transmission", R1-1908166, 3GPP TSG RAN WG1 Meeting #98, Prague, Czech, Aug. 17, 2019, See Sections 2.1-2.4.
(Continued)

*Primary Examiner* — Eric Nowlin
(74) *Attorney, Agent, or Firm* — BRYAN CAVE LEIGHTON PAISNER LLP

(57) ABSTRACT

Disclosed in the present invention are a method for transmitting/receiving a PDSCH in a wireless communication system, and a device therefor.
Particularly, a method by which a terminal receives a PDSCH comprises the steps of: receiving configuration information, the configuration information including (i) first information for configuring semi-persistent downlink transmission and (ii) second information related to control resource sets (CORESETs), the first information including a plurality of configurations related to downlink semi-persistent scheduling (SPS), and (i) a first CORESET, which corresponds to a first CORESET group index, and (ii) a second CORESET, which corresponds to a second CORE SET group index, being configured on the basis of the second information; receiving first downlink control information (DCI) based on the first CORESET and second DCI based on a second CORESET, the semi-persistent downlink transmission being activated on the basis of the first DCI and/or the second DCI; and receiving a semi-persistent scheduling PDSCH on the basis of the activation, the SPS (Continued)

PDSCH being associated with a CORESET group index corresponding to a CORESET, which has received DCI by which the semi-persistent downlink transmission is activated.

16 Claims, 15 Drawing Sheets

(56) References Cited

U.S. PATENT DOCUMENTS

| | | | |
|---|---|---|---|
| 10,652,881 B2* | 5/2020 | Babaei | H04L 1/1887 |
| 10,959,250 B2* | 3/2021 | Yang | H04W 52/06 |
| 11,109,223 B2* | 8/2021 | Zhou | H04W 24/08 |
| 11,296,827 B2* | 4/2022 | Yang | H04L 1/1812 |
| 11,503,619 B2* | 11/2022 | Yang | H04W 72/569 |
| 11,800,522 B2* | 10/2023 | Jassal | H04L 1/1671 |
| 2018/0049229 A1* | 2/2018 | Dinan | H04W 72/21 |
| 2018/0092122 A1* | 3/2018 | Babaei | H04L 1/1822 |
| 2019/0082454 A1 | 3/2019 | Shi et al. | |
| 2019/0253904 A1* | 8/2019 | Tsai | H04W 16/14 |
| 2019/0349180 A1* | 11/2019 | Lu | H04L 27/2607 |
| 2019/0356427 A1* | 11/2019 | Babaei | H04L 1/1812 |
| 2019/0373450 A1* | 12/2019 | Zhou | H04W 76/11 |
| 2020/0015250 A1* | 1/2020 | Yang | H04W 76/11 |
| 2020/0036480 A1* | 1/2020 | Yang | H04L 1/1812 |
| 2020/0037305 A1* | 1/2020 | Yang | H04L 5/0035 |
| 2020/0100239 A1* | 3/2020 | Jassal | H04L 5/0094 |
| 2020/0205141 A1* | 6/2020 | Khoshnevisan | H04L 5/0044 |
| 2020/0205175 A1* | 6/2020 | Yang | H04W 52/06 |
| 2021/0266944 A1* | 8/2021 | Noh | H04W 72/0453 |
| 2022/0166541 A1* | 5/2022 | Takeda | H04L 1/1864 |
| 2022/0353046 A1* | 11/2022 | Matsumura | H04L 1/1854 |

OTHER PUBLICATIONS

CATT, "Discussion on PUSCH Resource Collision and DL SPS Enhancement", R1-1908600, 3GPP TSG RAN WG1 Meeting #98, Prague, Czech, Aug. 17, 2019, See Sections 3-3.2.

Ericsson, "On Multi-TRP Based URLLC Schemes for Downlink SPS", R1-1907426, 3GPP TSG RAN WG1 Meeting #97, Reno, USA, May 3, 2019, See Section 2; and Figure 1.

Ericsson, "Triggering of Conditional Handover in NRL", R2-1909331, 3GPP TSG RAN WG2 Meeting #107, Prague, Czech, Aug. 15, 2019, See section 2.

Ericsson, "Suspend While Monitoring CHO in NR", R2-1909335 (Revision of R2-1906216), 3GPP TSG RAN WG2 Meeting #107, Prague, Czech, Aug. 15, 2019, See section 2.1.

Ericsson, "Conditional Handover Execution in NR" R2-1909332, 3GPP TSG RAN WG2 Meeting #107, Prague, Czech, Aug. 15, 2019, See section 2.

Samsung, "CHO Configuration/Execution, General Aspects Still Remaining" R2-1909941, 3GPP TSG RAN WG2 Meeting #107, Prague, Czech, Aug. 16, 2019, See section 2.1,2.2.

* cited by examiner

[FIG. 1]
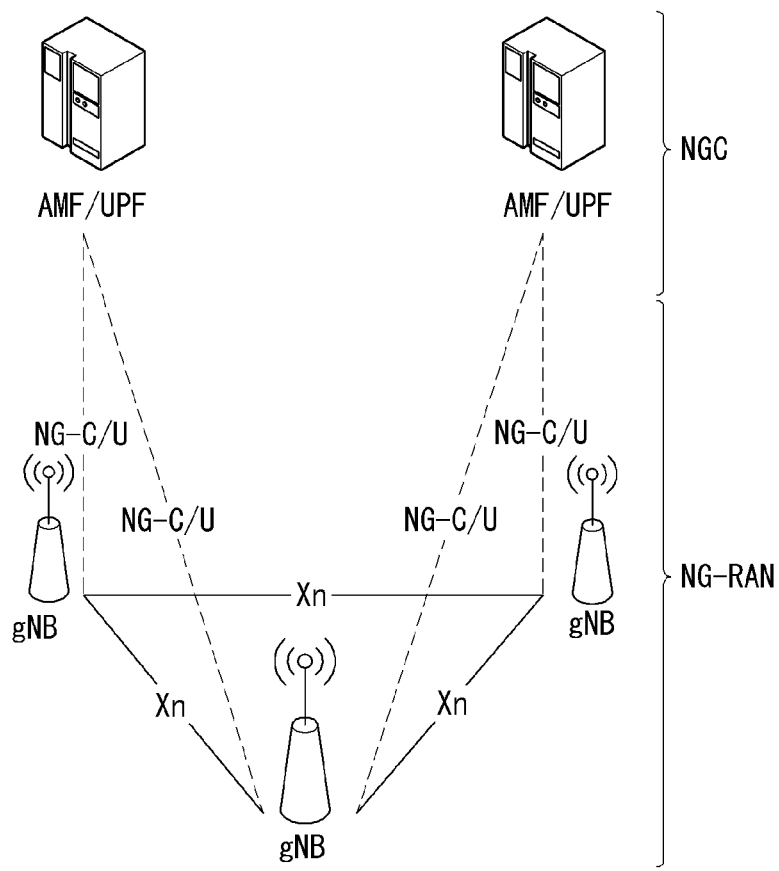
[FIG. 2]
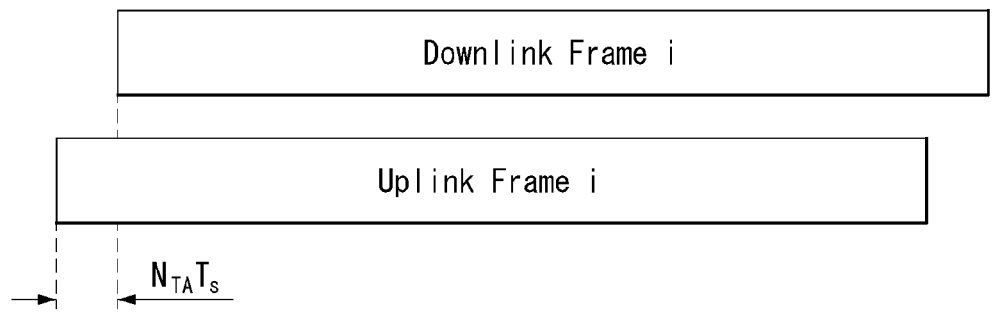

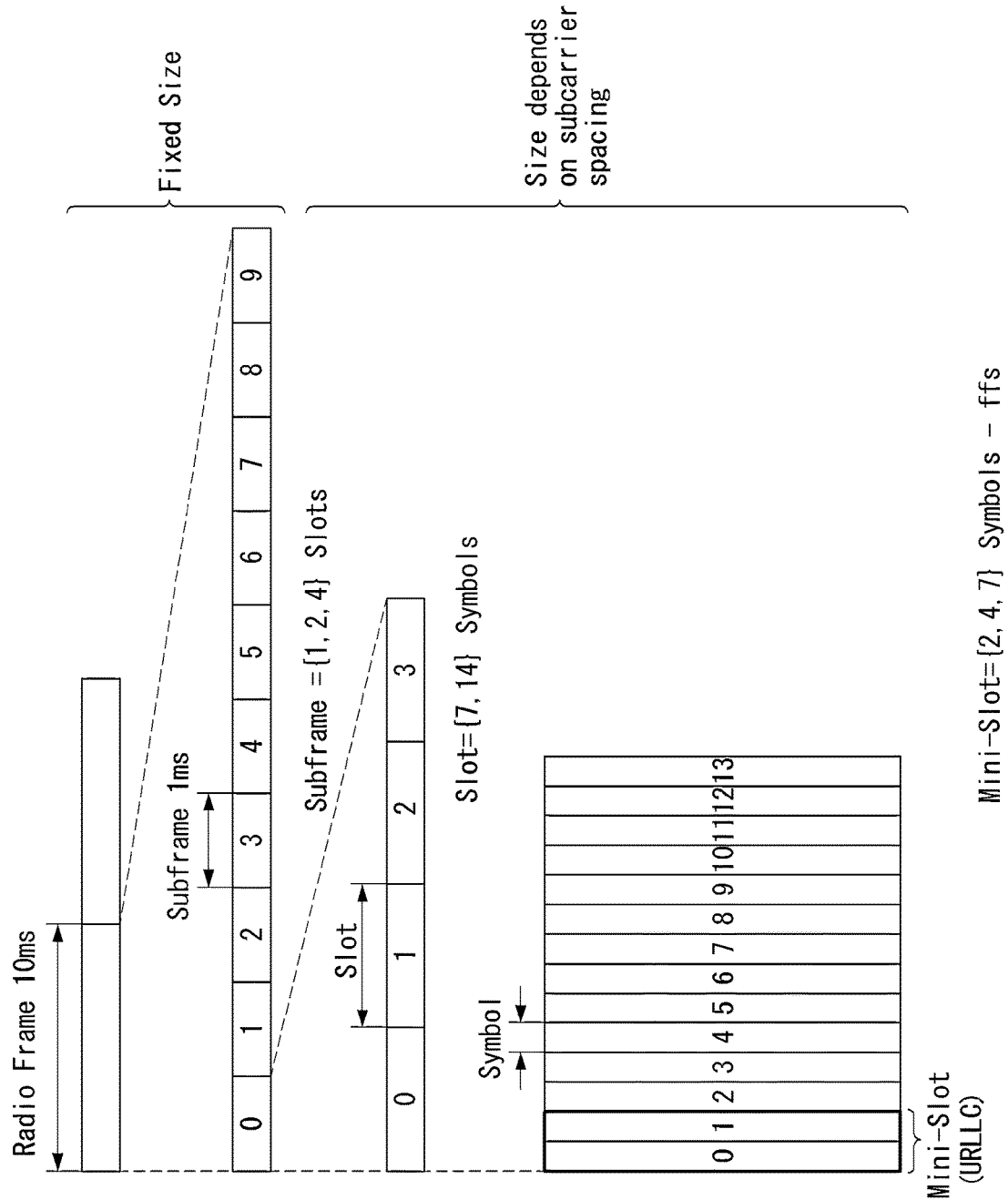
[FIG. 3]

[FIG. 4]
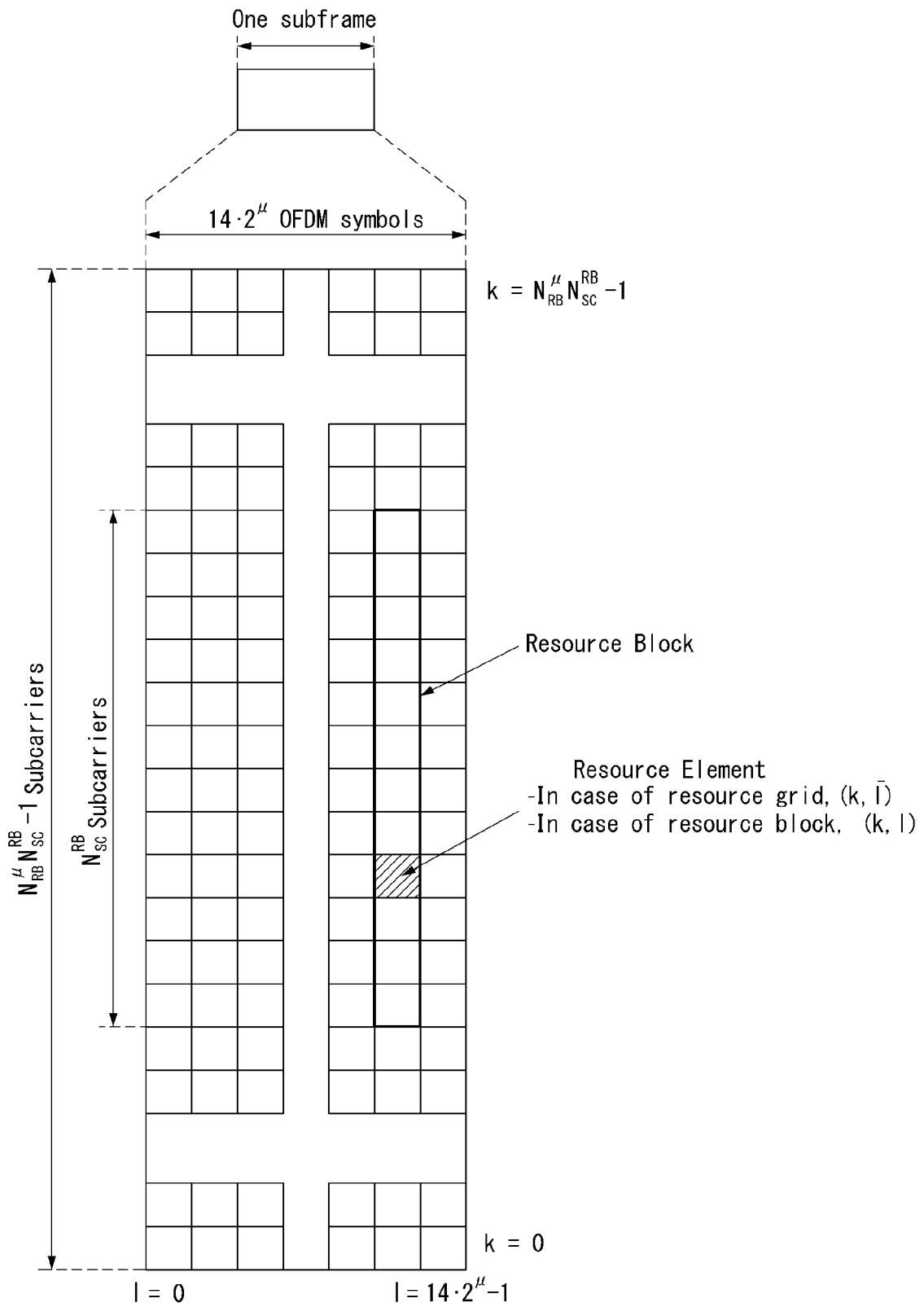

[FIG. 5]
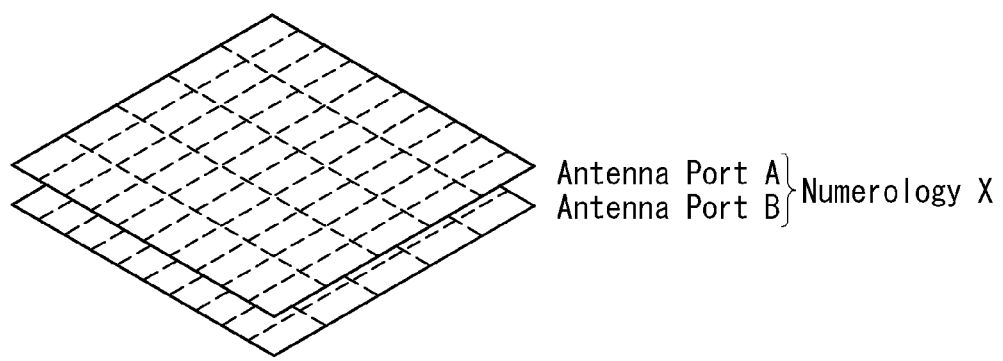
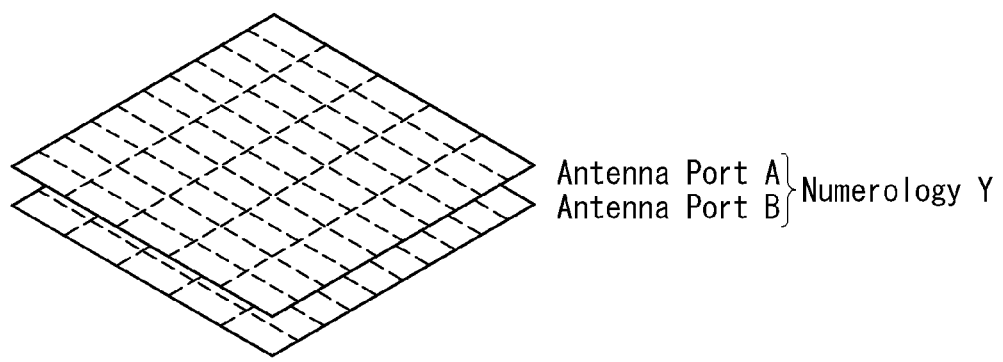

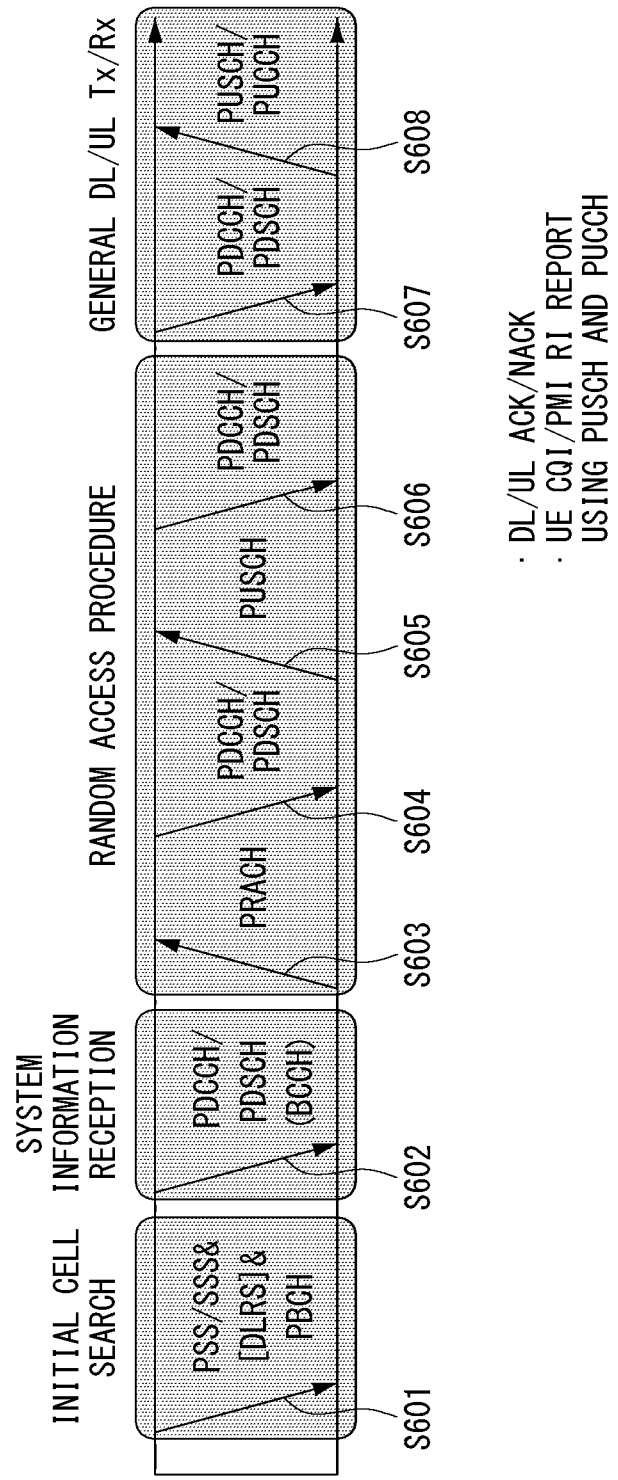
[FIG. 6]

[FIG. 7]
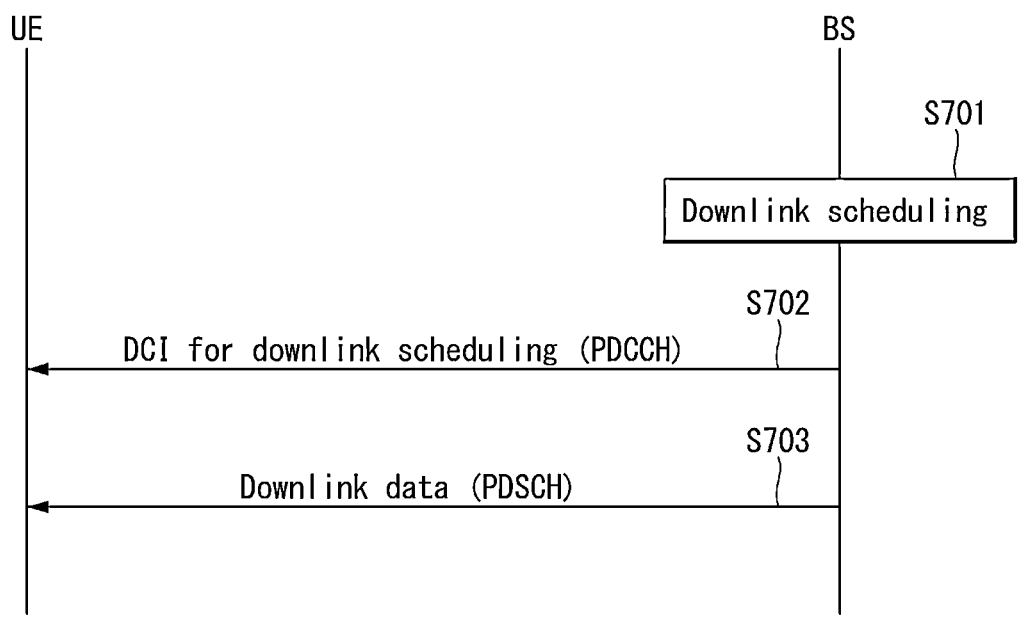

[FIG. 8]
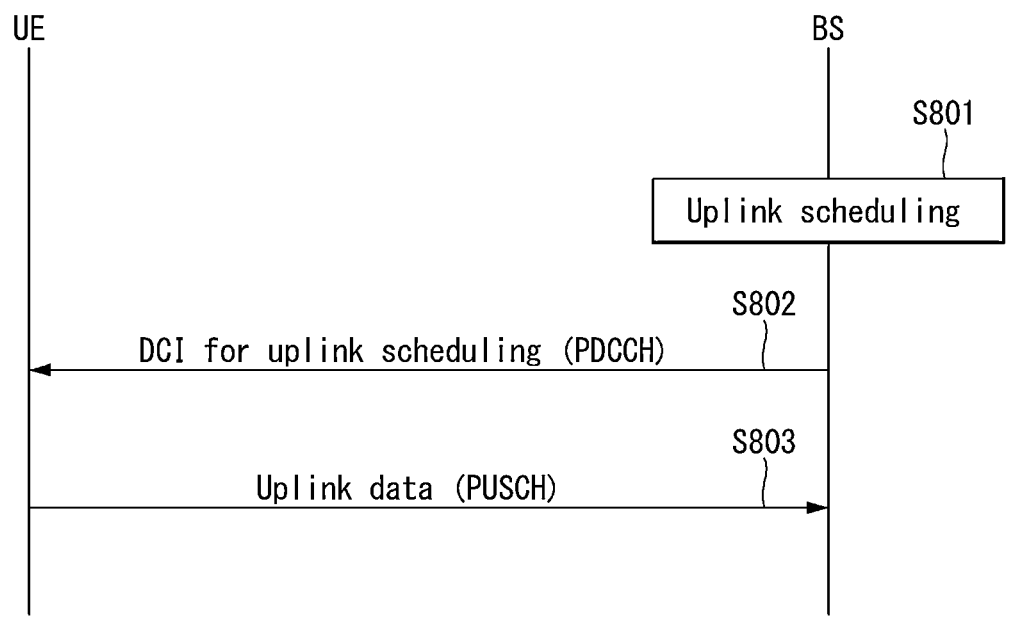

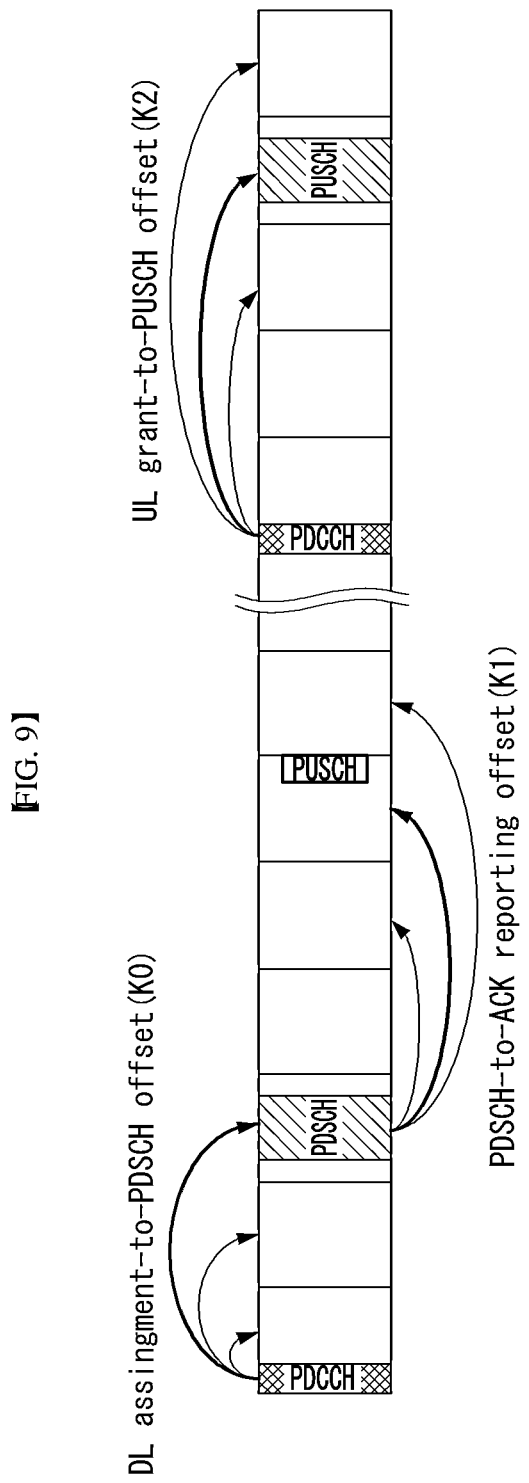
[FIG. 9]

[FIG. 10]
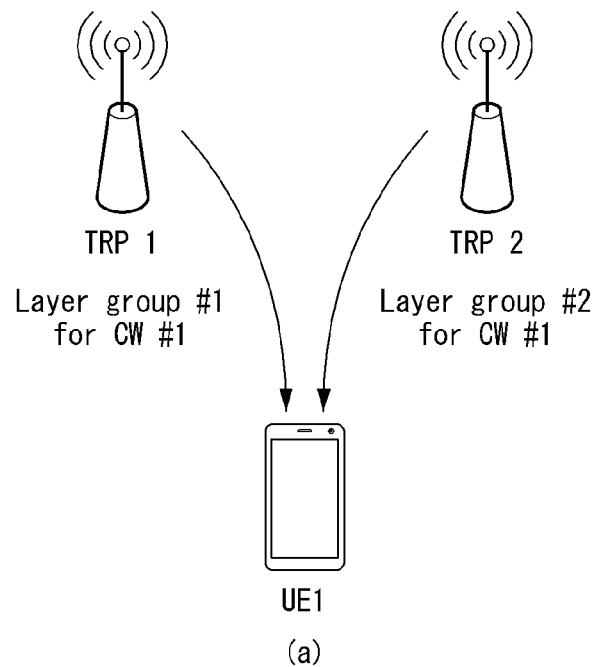
(a)
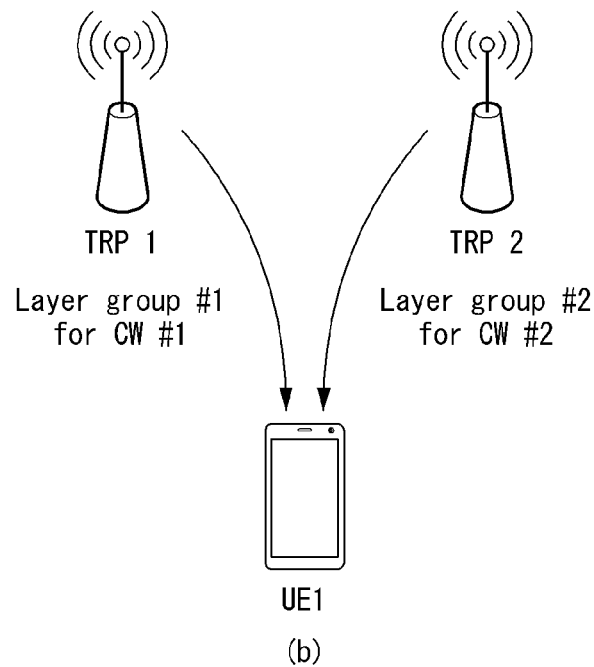
(b)

[FIG. 11]

[FIG. 12]
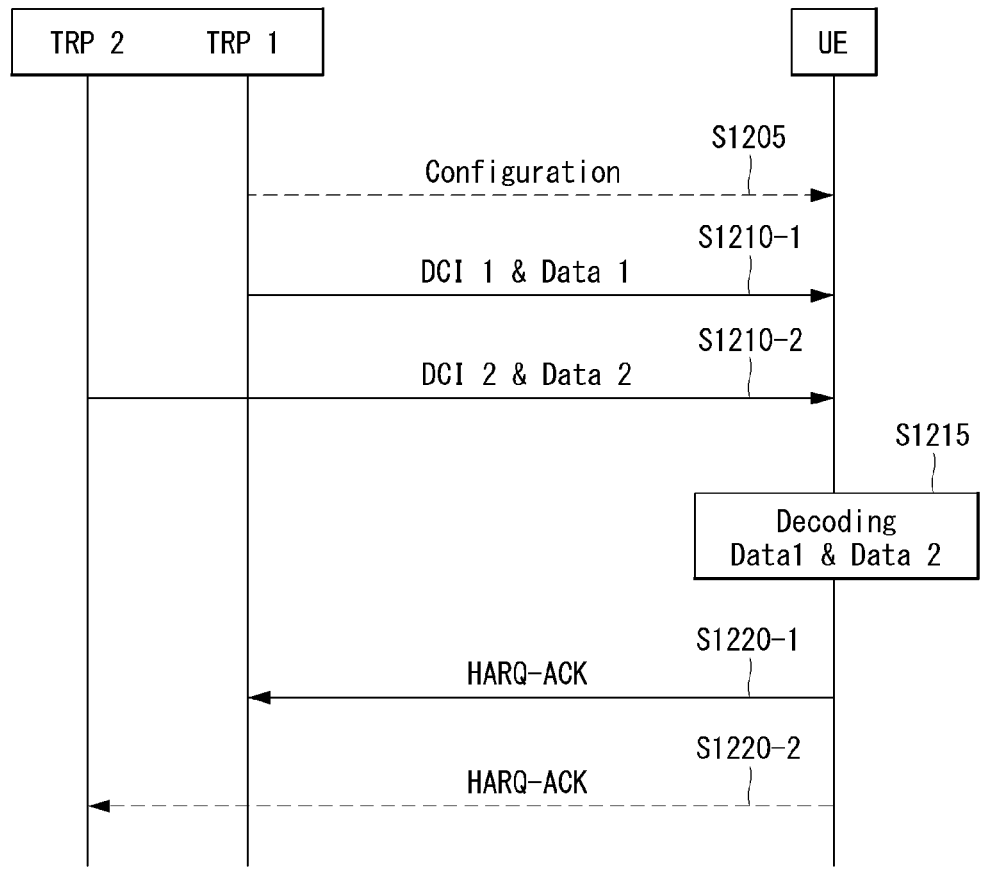
[FIG. 13]
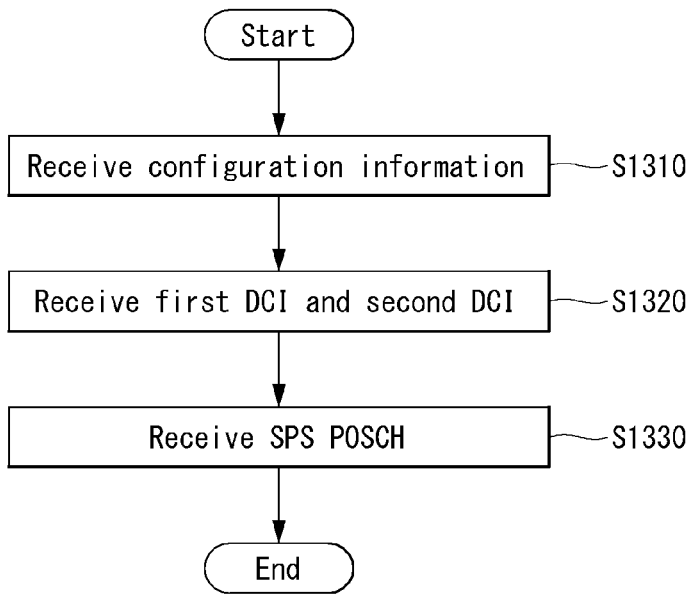

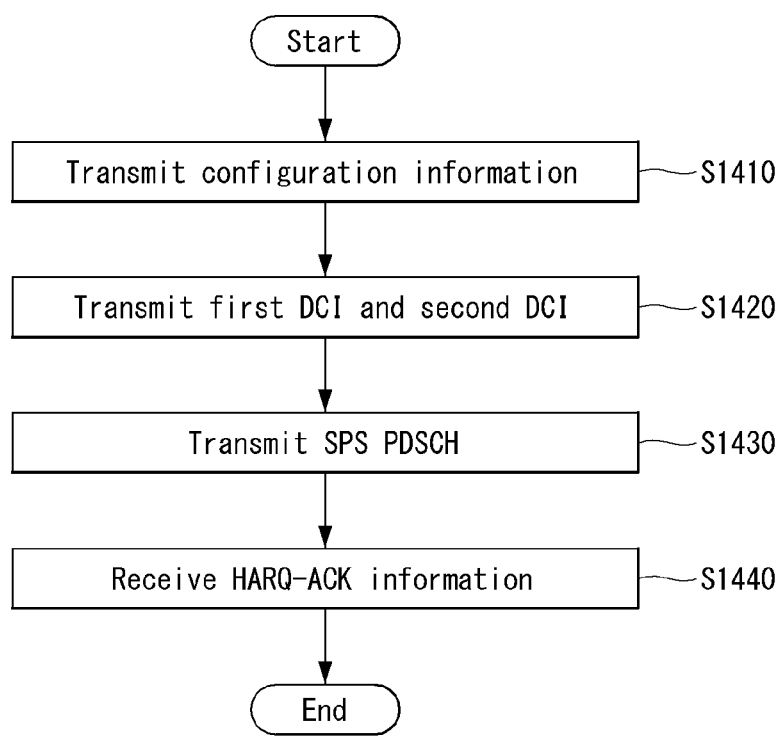
[FIG. 14]

[FIG. 15]
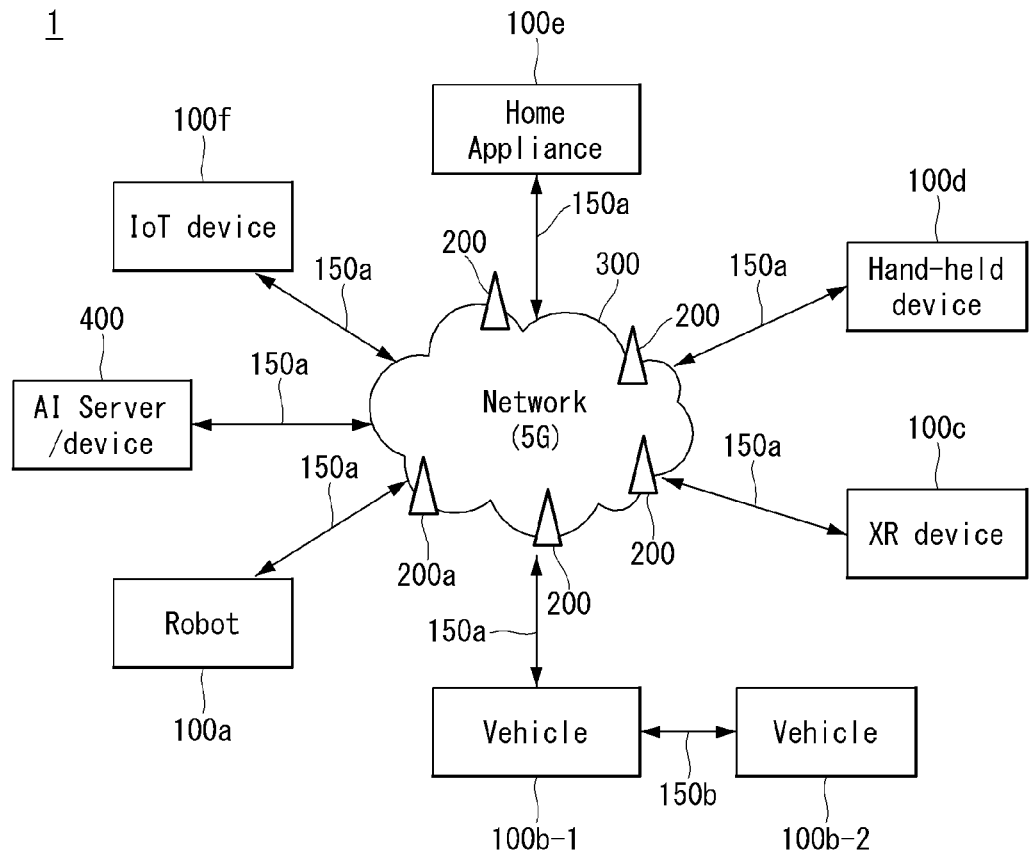
[FIG. 16]
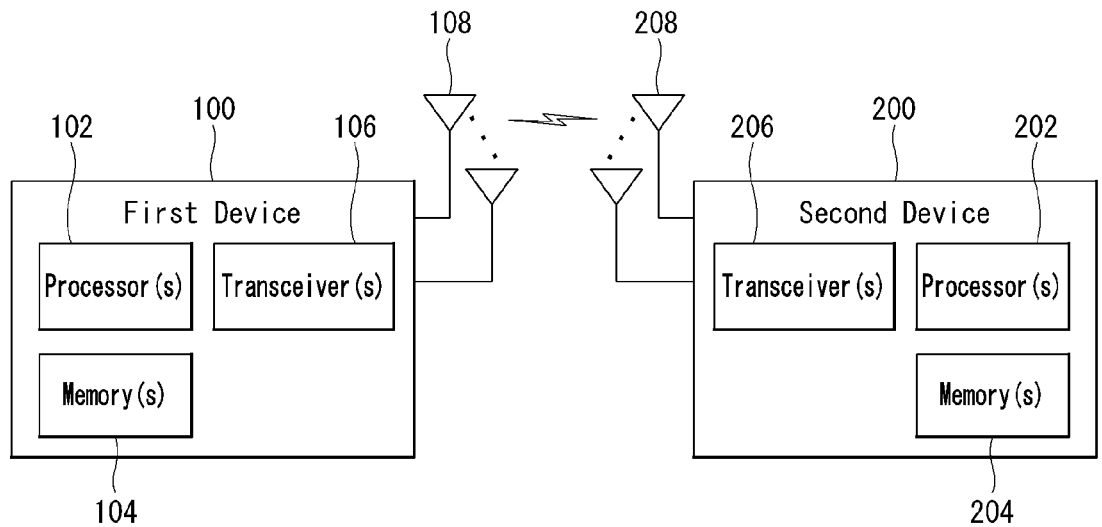

[FIG. 17]
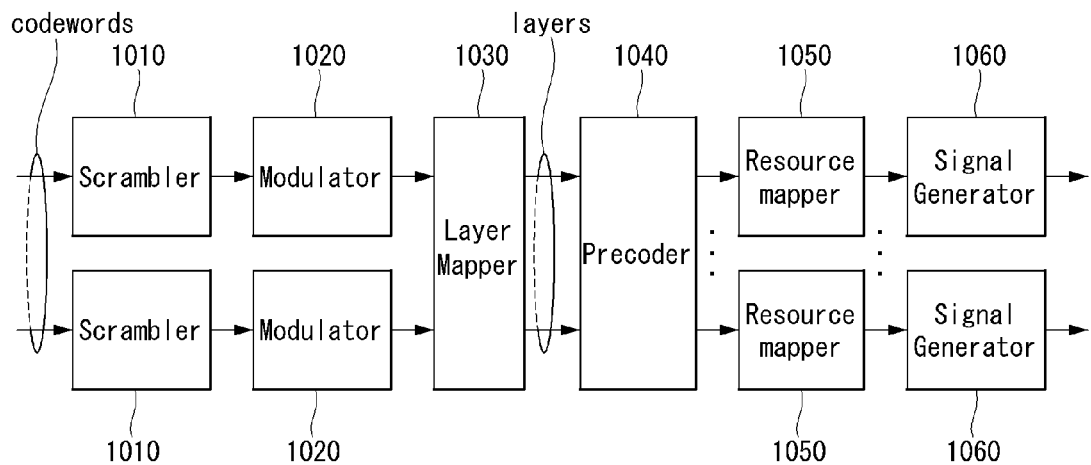
[FIG. 18]
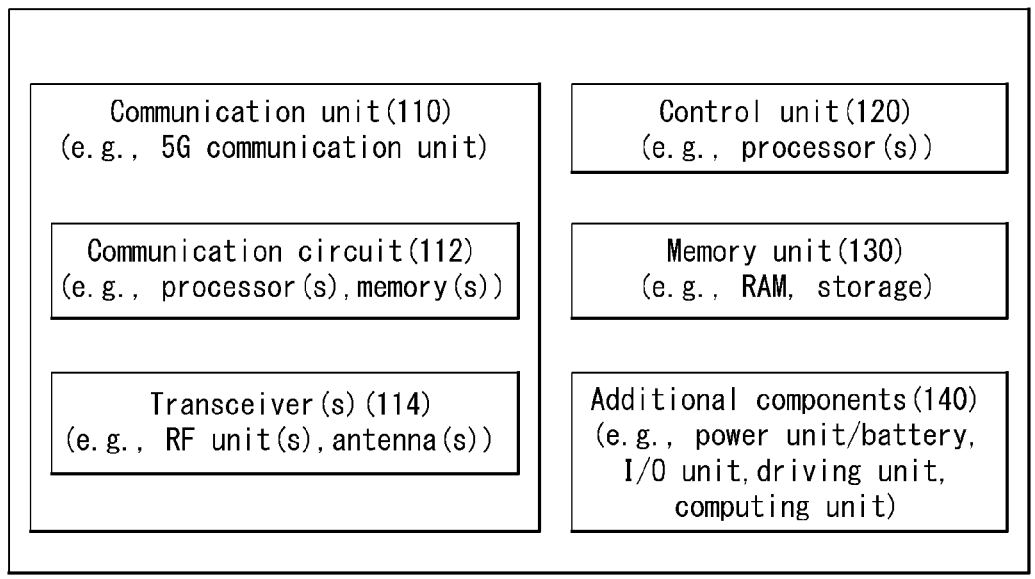

[FIG. 19]
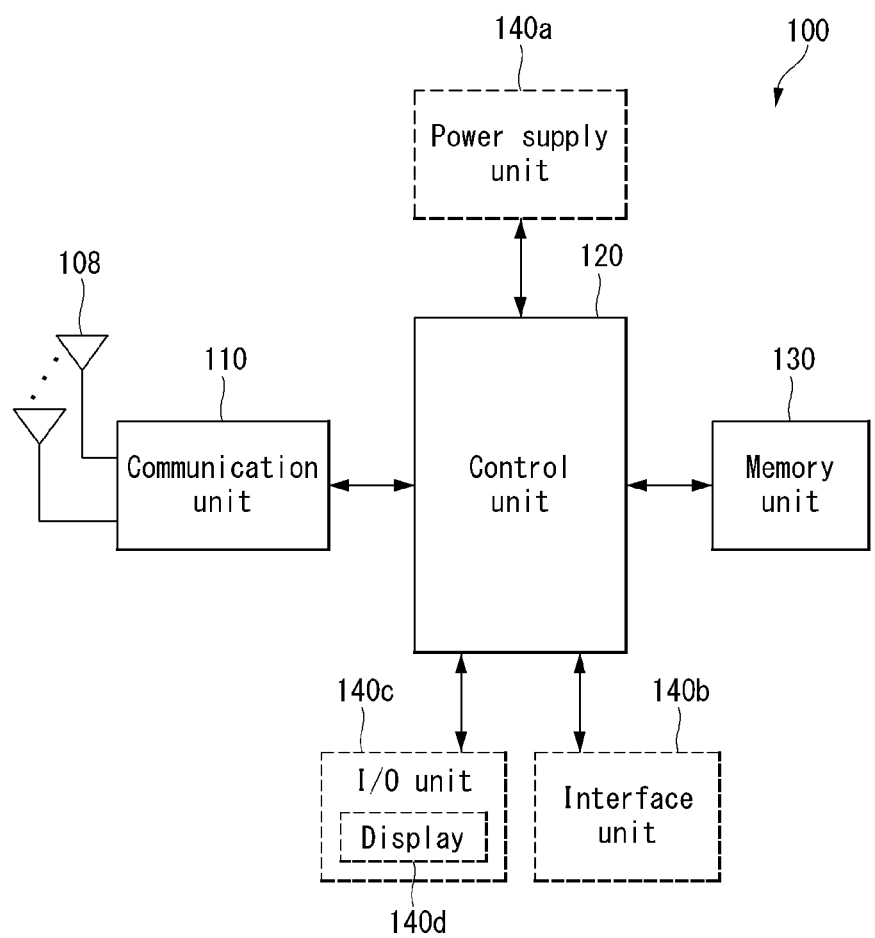

METHOD FOR TRANSMITTING/RECEIVING PDSCH IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/013517, filed on Oct. 5, 2020, which claims the benefit of Korea patent Application No. 10-2019-0123423, filed on Oct. 4, 2019, the contents of which are all hereby incorporated by reference herein in their entirety.

TECHNICAL FIELD

The present disclosure relates to a wireless communication system, and more particularly to a method for transmitting and receiving SPS PDSCH based on multiple transmission reception points TRP and a device supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure proposes a method for receiving, by a UE supported by multiple transmission reception points (TRPs), a PDSCH in a wireless communication system.

Specifically, the present disclosure proposes a method for scheduling an SPS PDSCH and a method for transmitting/receiving the SPS PDSCH between multiple TRPs and a UE by considering multiple TRP operations.

Further, the present disclosure proposes a method for scheduling the PDSCH by using DCI format 1_0 in multiple DCI based M-TRP transmission.

Further, the present disclosure proposes a method for differently configuring HARQ process IDs for SPS PDSCHs transmitted from multiple TRPs by considering multiple TRP operations.

Technical objects to be achieved by the present disclosure are not limited to the aforementioned technical objects, and other technical objects not described above may be evidently understood by a person having ordinary skill in the art to which the present disclosure pertains from the following description.

Technical Solution

A method of receiving, by a user equipment (UE), a physical downlink shared channel (PDSCH) in a wireless communication system according to an embodiment of the present disclosure may include: receiving configuration information, in which the configuration information includes (i) first information for configuring semi-persistent downlink transmission and (ii) second information related to control resource sets (CORESETs), the first information includes multiple configurations related to downlink semi-persistent scheduling (SPS), and (i) a first CORESET corresponding to a first CORESET group index and (ii) a second CORESET corresponding to a second CORESET group index are configured based on the second information; receiving first downlink control information (DCI) based on the first CORESET and second DCI based on the second CORESET, in which the semi-persistent downlink transmission is activated based on at least one of the first DCI or the second DCI; and receiving a semi-persistent scheduling (SPS) PDSCH based on the activation, in which the SPS PDSCH is related to a CORESET group index corresponding to a CORESET which receives the DCI by which the semi-persistent downlink transmission is activated.

Further, in the method according to an embodiment of the present disclosure, a plurality of SPS PDSCHs including a first SPS PDSCH and a second SPS PDSCH may be received based on the semi-persistent downlink transmission being based by each of the first DCI and the second DCI.

Further, in the method according to an embodiment of the present disclosure, the first SPS PDSCH may be related to the first CORESET group index corresponding to the first CORESET which receives the first DCI, and the second SPS PDSCH may be related to the second CORESET group index corresponding to the second CORESET which receives the second DCI.

Further, in the method according to an embodiment of the present disclosure, the plurality of SPS PDSCHs may be overlapped and received in a time domain.

Further, in the method according to an embodiment of the present disclosure, the first SPS PDSCH and the second SPS PDSCH may be received based on the same specific configuration among multiple configurations included in the first information.

Further, in the method according to an embodiment of the present disclosure, a first configuration among multiple configurations included in the first information may be activated based on the first DCI, and a second configuration among multiple configurations included in the first information may be activated based on the second DCI.

Further, in the method according to an embodiment of the present disclosure, an SPS PDSCH related to the first CORESET group index corresponding to the first CORESET which receives the first DCI may be received based on the first configuration.

Further, in the method according to an embodiment of the present disclosure, each of the multiple configurations included in the first information may include information related to the CORESET group index.

Further, the method according to an embodiment of the present disclosure may further include receiving an HARQ process identifier related to the SPS PDSCH.

Further, in the method according to an embodiment of the present disclosure, each of the multiple configurations included in the first information may include the number of HARQ processes and period information.

Further, in the method according to an embodiment of the present disclosure, each of a first HARQ process identifier related to the SPS PDSCH activated based on the first DCI and a second HARQ process identifier related to the SPS PDSCH activated based on the second DCI may be configured and received.

Further, in the method according to an embodiment of the present disclosure, the second HARQ process identifier may be calculated by adding an offset value to the first HARQ process identifier.

Further, in the method according to an embodiment of the present disclosure, the offset value may be determined based on the number of HARQ processes.

Further, in the method according to an embodiment of the present disclosure, the HARQ process identifier may be configured based on the CORESET group index corresponding to the CORESET which receives the DCI by which the semi-persistent downlink transmission is activated.

A user equipment (UE) receiving a physical downlink shared channel (PDSCH) in a wireless communication system according to an embodiment of the present disclosure may include: one or more transceivers; one or more processors; and one or more memories storing instructions for operations executed by the one or more processors and connected to the one or more processors, in which the operations may include receiving configuration information, the configuration information may include (i) first information for configuring semi-persistent downlink transmission and (ii) second information related to control resource sets (CORESETs), the first information may include multiple configurations related to downlink semi-persistent scheduling (SPS), and (i) a first CORESET corresponding to a first CORESET group index and (ii) a second CORESET corresponding to a second CORESET group index may be configured based on the second information, receiving first downlink control information (DCI) based on the first CORESET and second DCI based on the second CORESET, in which the semi-persistent downlink transmission may be activated based on at least one of the first DCI or the second DCI, and receiving a semi-persistent scheduling (SPS) PDSCH based on the activation, and in which the SPS PDSCH may be related to a CORESET group index corresponding to a CORESET which receives the DCI by which the semi-persistent downlink transmission is activated.

A method of transmitting, by a base station (BS), a physical downlink shared channel (PDSCH) in a wireless communication system according to an embodiment of the present disclosure may include: transmitting, to a user equipment (UE), configuration information, in which the configuration information may include (i) first information for configuring semi-persistent downlink transmission and (ii) second information related to control resource sets (CORESETs), the first information may include multiple configurations related to downlink semi-persistent scheduling (SPS), and (i) a first CORESET corresponding to a first CORESET group index and (ii) a second CORESET corresponding to a second CORESET group index may be configured based on the second information, transmitting first downlink control information (DCI) based on the first CORESET and second DCI based on the second CORESET, in which the semi-persistent downlink transmission may be activated based on at least one of the first DCI or the second DCI; and transmitting, to the UE, a semi-persistent scheduling (SPS) PDSCH based on the activation, and in which the SPS PDSCH may be related to a CORESET group index corresponding to a CORESET which receives the DCI by which the semi-persistent downlink transmission is activated.

A base station (BS) transmitting a physical downlink shared channel (PDSCH) in a wireless communication system according to an embodiment of the present disclosure may include: one or more transceivers; one or more processors; and one or more memories storing instructions for operations executed by the one or more processors and connected to the one or more processors, in which the operations may include transmitting, to a user equipment (UE), configuration information, in which the configuration information may include (i) first information for configuring semi-persistent downlink transmission and (ii) second information related to control resource sets (CORESETs), the first information may include multiple configurations related to downlink semi-persistent scheduling (SPS), and (i) a first CORESET corresponding to a first CORESET group index and (ii) a second CORESET corresponding to a second CORESET group index may be configured based on the second information, transmitting first downlink control information (DCI) based on the first CORESET and second DCI based on the second CORESET, in which the semi-persistent downlink transmission may be activated based on at least one of the first DCI or the second DCI, and transmitting, to the UE, a semi-persistent scheduling (SPS) PDSCH based on the activation, and in which the SPS PDSCH may be related to a CORESET group index corresponding to a CORESET which receives the DCI by which the semi-persistent downlink transmission is activated.

In a device comprising: one or more memories and one or more processors functionally connected to the one or more memories system according to an embodiment of the present disclosure, the one or more processors may be configured to control the device to receive configuration information, receive control information (DCI) based on a first CORESET and second DCI based on a second CORESET based on the configuration information, and receive a semi-persistent scheduling (SPS) PDSCH, in which the configuration information may include (i) first information for configuring semi-persistent downlink transmission and (ii) second information related to control resource sets (CORESETs), the first information may include multiple configurations related to downlink semi-persistent scheduling (SPS), (i) the first CORESET corresponding to a first CORESET group index and (ii) the second CORESET corresponding to a second CORESET group index may be configured based on the second information, the transmission of the SPS PDSCH may be activated based on at least one of the first DCI or the second DCI, and the SPS PDSCH may be related to a CORESET group index corresponding to a CORESET which receives the DCI by which the semi-persistent downlink transmission is activated.

In one or more non-transitory computer-readable media storing one or more instructions according to an embodiment of the present disclosure, the one or more instructions executable by one or more processors may include instructions for instructing a user equipment (UE) to receive configuration information; receive control information (DCI) based on a first CORESET and second DCI based on a second CORESET based on the configuration information; and receive a semi-persistent scheduling (SPS) PDSCH, and the configuration information may include (i) first information for configuring semi-persistent downlink transmission and (ii) second information related to control resource sets (CORESETs), the first information may include multiple configurations related to downlink semi-persistent scheduling (SPS), (i) the first CORESET corresponding to a first CORESET group index and (ii) the second CORESET corresponding to a second CORESET group index may be configured based on the second information, the transmission of the SPS PDSCH may be activated based on at least one of the first DCI or the second DCI, and the SPS PDSCH may be related to a CORESET group index corresponding to a CORESET which receives the DCI by which the semi-persistent downlink transmission is activated.

Advantageous Effects

According to an embodiment of the present disclosure, it is possible to schedule a PDSCH by using DCI format 1_0 in multiple DCI based M-TRP transmission.

Further, according to an embodiment of the present disclosure, multiple TRPs can schedule SPS PDSCH transmission to a UE, and the UE can receive the SPS PDSCH transmitted through/using multiple TRPs.

Further, according to an embodiment of the present disclosure, the UE can determine an SPS configuration which may be applied when receiving the SPS PDSCH transmitted through/using multiple TRPs.

Further, according to an embodiment of the present disclosure, it is possible to differently configure HARQ process IDs for the SPS PDSCHs transmitted from multiple TRPs.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings, which are included to provide a further understanding of the present disclosure and are incorporated on and constitute a part of the present disclosure illustrate embodiments of the present disclosure and together with the description serve to explain the principles of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission.

FIG. 7 illustrates an example of a downlink transmission/reception operation.

FIG. 8 illustrates an example of an uplink transmission/reception operation.

FIG. 9 illustrates an example of HARQ-ACK timing (K1).

FIG. 10 illustrates an example of a transmission/reception method for improving reliability using transmission in multiple TRPs.

FIG. 11 illustrates an example of SPS PDSCH transmission performed by multiple TRPs (hereinafter, referred to as M-TRP).

FIG. 12 illustrates an example of a signaling procedure of performing data transmission and reception between a network side and a UE in a situation of multiple TRPs to which a method and/or embodiments proposed in the present disclosure may be applied.

FIG. 13 illustrates an example of an operation flowchart of a UE receiving an SPS PDSCH to which a method and/or an embodiment proposed in the present disclosure may be applied.

FIG. 14 illustrates an example of an operation flowchart of a BS transmitting an SPS PDSCH to which a method and/or an embodiment proposed in the present disclosure may be applied.

FIG. 15 illustrates a communication system applied to the present disclosure.

FIG. 16 illustrates a wireless device which may be applied to the present disclosure.

FIG. 17 illustrates a signal processing circuit for a transmit signal.

FIG. 18 illustrates another example of a wireless device applied to the present disclosure.

FIG. 19 illustrates a portable device applied to the present disclosure.

MODE FOR DISCLOSURE

Reference will now be made in detail to embodiments of the present disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the present disclosure may be referred to for a background art, terms, omissions, etc., used for describing the present disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHZ). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

DEFINITION OF TERMS eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 KHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are $n_{s,f}^\mu \in \{0, \ldots, N_{frame}^{slots,\mu}-1\}$ numbered in increasing order of within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu} N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k, l̄), where k=0, . . . , $N_{RB}^{\mu} N_{sc}^{RB} - 1$ is an index on a frequency domain, and l̄=0, . . . , $2^{\mu} N_{symb}^{(\mu)} - 1$ refers to a location of a symbol in a subframe. The index pair (k,l) is used to refer to a resource element in a slot, where l=0, . . . , $N_{symb}^{\mu} - 1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indices p and μ may be dropped, and as a result, the complex value may be $a_{k,\bar{l}}^{(p)}$ or $a_{k,\bar{l}}$.

Further, a physical resource block is defined as $N_{sc}^{RB} = 12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size} - 1$ where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, mMTC, V2X, etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the BS may instruct the UE to operate only in a partial bandwidth rather than the entire bandwidth of the wideband CC and intends to define the corresponding partial bandwidth as the bandwidth part (BWP) for convenience. The BWP may consist of consecutive resource blocks (RBs) on the frequency axis and may correspond to one numerology (e.g., sub-carrier spacing, CP length, slot/mini-slot duration).

A base station may configure multiple BWPs even within one CC configured to the UE. As one example, a BWP occupying a relatively small frequency domain may be configured in a PDCCH monitoring slot, and a PDSCH indicated in PDCCH may be scheduled onto a BWP larger than this. Alternatively, when UEs are concentrated on a specific BWP, some UEs may be configured with other BWPs for load balancing. Alternatively, considering frequency domain inter-cell interference cancellation between neighboring cells, a partial spectrum of the entire bandwidth may be excluded and both BWPs may be configured even in the same slot. That is, the base station may configure at least one DL/UL BWP to the UE associated with the wideband CC and may activate at least one DL/UL BWP (by L1 signaling or MAC CE or RRC signaling) among configured DL/UL BWP(s) at a specific time, and switching may be indicated to another configured DL/UL BWP (by L1 signaling or MAC CE or RRC signaling) or a timer value may be switched to the fixed DL/UL BWP when a timer value is expired based on a timer. In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

Physical Channel and General Signal Transmission

FIG. 6 illustrates physical channels and general signal transmission. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

For example, in an NR system, DCI format 0_0 and DCI format 0_1 are used for scheduling of PUSCH in one cell, and DCI format 1_0 and DCI format 1_1 are used for scheduling PDSCH in one cell. Information included in DCI format 0_0 is CRC scrambled by C-RNTI or CS-RNTI or MCS-C-RNTI and transmitted. And, DCI format 0_1 is used for reserving PUSCH in one cell. Information included in DCI format 0_1 may be CRC scrambled by C-RNTI or CS-RNTI or SP-CSI-RNTI or MCS-C-RNTI and transmitted. DCI format 1_0 is used for scheduling PDSCH in one DL cell. Information included in DCI format 1_0 is CRC scrambled by C-RNTI or CS-RNTI or MCS-C-RNTI and transmitted. DCI format 1_1 is used for scheduling PDSCH in one cell. Information included in DCI format 1_1 is CRC scrambled by C-RNTI or CS-RNTI or MCS-C-RNTI and transmitted. DCI format 2_1 is used to inform PRB(s) and OFDM symbol(s) that the UE may assume that transmission is not intended. The following information included in DCI format 2_1 such as preemption indication 1, preemption indication 2, . . . , preemption indication N is CRC scrambled by INT-RNTI and transmitted.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., via the PUSCH and/or PUCCH.

Physical Uplink Control Channel (PUCCH)

A PUCCH supports multiple formats, and the PUCCH formats may be classified based on a symbol duration, a payload size, and multiplexing. The following Table 5 represents an example of the PUCCH format.

TABLE 5

| Format | PUCCH length in OFDM symbols | Number of bits | Usage | Others |
|---|---|---|---|---|
| 0 | 1-2 | ≤2 | 1 | Sequence selection |
| 1 | 4-14 | ≤2 | 2 | Sequence modulation |
| 2 | 1-2 | >2 | 4 | CP-OFDM |
| 3 | 4-14 | >2 | 8 | DFT-s-OFDM (no UE multiplexing) |
| 4 | 4-14 | >2 | 16 | DFT-s-OFDM (Pre DFT OCC) |

The PUCCH formats of Table 5 may be roughly divided into (1) a short PUCCH and (2) a long PUCCH. The PUCCH formats 0 and 2 may be included in the short PUCCH, and the PUCCH formats 1, 3 and 4 may be included in the long PUCCH.

A UE transmits one or two PUCCHs via a serving cell on different symbols within one slot. If the UE transmits two PUCCHs in one slot, at least one of the two PUCCHs has a structure of a short PUCCH. That is, in one slot, (1) the transmission of a short PUCCH and a short PUCCH is possible and (2) the transmission of a long PUCCH and a short PUCCH is possible, but (3) the transmission of a long PUCCH and a long PUCCH is impossible.

Downlink Transmission/Reception Operation

FIG. 7 illustrates an example of a downlink transmission and reception operation.

Referring to FIG. 7, the eNB may schedule downlink transmission such as the frequency/time resource, the transport layer, a downlink precoder, the MCS, etc., (S701). Specifically, the eNB may determine a beam for PDSCH transmission to the UE. In addition, the UE may receive Downlink Control Information (DCI) for downlink scheduling (i.e., including scheduling information of the PDSCH) on the PDCCH (S702). DCI format 1_0 or DCI format 1_1 may be used for the downlink scheduling and specifically, DCI format 1_1 may include information such as the following examples: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization.

In particular, according to each state/index indicated in an antenna port(s) field, the number of DMRS ports may be scheduled, and single-user (SU)/Multi-user (MU) transmission scheduling is also available. In addition, the TCI field consists of 3 bits, and the QCL for the DMRS may be dynamically indicated by indicating a maximum of 8 TCI states according to the TCI field value. The UE may receive downlink data from the base station on the PDSCH (S703). When the UE detects a PDCCH including DCI format 1_0 or 1_1, the UE may decode the PDSCH according to an indication by the corresponding DCI.

Here, when the UE receives a PDSCH scheduled by DCI format 1_1, a DMRS configuration type may be configured by higher layer parameter "dmrs-Type" in the UE and the DMRS configuration type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not related to PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P' is determined as any one of {2 and 4}, a Precoding Resource Block (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE may first read a 5-bit MCD field in the DCI and determine the modulation order and the target code rate. In addition, the UE may read a redundancy version field in the DCI and determine a redundancy version. In addition, the UE may determine the transport block size by using the number of layers before rate matching and the total number of allocated PRBs.

A transport block may be made up of one or more code block groups (CBG), and one CBG may be made up of one or more code blocks (CB). Also, in an NR system, data transmission and reception may be performed for each CB/CBG as well as for each transport block. Accordingly, ACK/NACK transmission and retransmission per CB/CBG also may be possible. The UE may receive information on CB/CBG from the base station through a DCI (e.g., DCI format 0_1 and DCI format 1_1). Also, the UE may receive information on a data transmission unit (e.g., TB/CB/CBG) from the base station.

Quasi-Co Location (QCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

In relation to the beam indication, the UE may be RRC-configured with a list for up to M candidate Transmission Configuration Indication (TCI) states for the purpose of at least Quasi Co-location (QCL) indication, where M may be 64.

Each TCI state may be configured in one RS set. IDs of each DL RS for the purpose of spatial QCL (QCL Type D) at least in the RS set may refer to one of DL RS types such as SSB, P-CSI RS, SP-CSI RS, and A-CSI RS. Initialization/update for the ID of DL RS(s) in the RS set that are used at least for the purpose of spatial QCL may be performed at least by explicit signaling.

The TCI-State IE associates one or two DL reference signals (RS) with a corresponding quasi co-location (QCL) type. The TCI-State IE may include parameters such as bwp-Id/reference signal/QCL type.

A bwp-Id parameter indicates DL BWP where RS is positioned, a cell parameter indicates a carrier where RS is positioned, a reference signal parameter indicates a reference antenna port(s) that is a source of quasi co-location for a corresponding target antenna port(s), or a reference signal including it. The target antenna port(s) may be CSI-RS, PDCCH DMRS, or PDSCH DMRS. For example, a corresponding TCI state ID may be indicated to NZP CSI-RS resource configuration information to indicate QCL reference RS information for NZP CSI-RS. As another example, a TCI state ID may be indicated in each CORESET configuration to indicate QCL reference information for the PDCCH DMRS antenna port(s). As another example, a TCI state ID may be indicated through DCI to indicate QCL reference information for the PDSCH DMRS antenna port(s).

UL Transmission/Reception Operation

FIG. 8 illustrates an example of an uplink transmission and reception operation.

Referring to the FIG. 8, the eNB may schedule uplink transmission such as the frequency/time resource, the transport layer, an uplink precoder, the MCS, etc., (S801). In particular, the eNB may determine a beam for PUSCH transmission of the UE through the beam management operations described above. And, the UE may receive, from the eNB, DCI for uplink scheduling (i.e., including scheduling information of the PUSCH) on the PDCCH (S802). DCI format 0_0 or 0_1 may be used for the uplink scheduling and in particular, DCI format 0_1 may include information such as the following examples: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter "usage" may be indicated by an SRS resource indicator field. Further, "spatialRelationInfo" may be configured for each SRS resource and a value of "spatialRelationinfo" may be one of {CRI, SSB, and SRI}.

In addition, the UE may transmit the uplink data to the eNB on the PUSCH (S803). When the UE detects a PDCCH including DCI format 0_0 or 0_1, the UE may transmit the corresponding PUSCH according to the indication by the corresponding DCI. Two schemes (Codebook based transmission and non-codebook based transmission scheme) are supported for PUSCH transmission.

In the case of the codebook based transmission, when higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 0_0, the PUSCH transmission is based on a single antenna port. In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "non-Codebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

The descriptions (e.g., 3GPP system, frame structure, DL and UL transmission and reception, etc.) given above may be applied/used in combination with methods and/or embodiments proposed in the present disclosure or may be supplemented to clarify technical features of the methods proposed in the present disclosure. In the present disclosure, the presence of a slash "/" may indicate that all or only some of words or phrases separated by/are included.

Hybrid Automatic Repeat and reQuest (HARQ)

In relation to a UE operation for reporting control information, a HARQ-ACK operation is described. HARQ in NR may have the following features.

1) 1-bit HARQ-ACK feedback may be supported per transport block (TB). Here, an operation of one DL HARQ process is supported for some UEs, whereas operations of one or more DL HARQ processes are supported for a given UE.

2) A UE may support a set of minimum HARQ processing times. Here, the minimum HARQ processing time means a minimum time required for the UE ranging from DL data from reception from a base station to corresponding HARQ-ACK transmission timing. In relation this, two UE processing times N1 and K1 may be defined depending on (1) symbol granularity and (2) slot granularity. First, from a UE perspective, N1 denotes the number of OFDM symbols required for UE processing from the last of PDSCH reception to the fastest start of corresponding HARQ-ACK transmission. The N1 may be defined as in the following Tables 6 and 7 depending on OFDM numerology (i.e., subcarrier spacing) and a DMRS pattern.

TABLE 6

| Configuration | HARQ Timing Parameter | Units | 15 KHz SCS | 30 KHz SCS | 60 KHz SCS | 120 KHz SCS |
|---|---|---|---|---|---|---|
| Front-loaded DMRS only | N1 | Symbols | 8 | 10 | 17 | 20 |
| Front-loaded DMRS only + additional DMRS | N1 | Symbols | 13 | 13 | 20 | 24 |

TABLE 7

| Configuration | HARQ Timing Parameter | Units | 15 KHz SCS | 30 KHz SCS | 60 KHz SCS |
|---|---|---|---|---|---|
| Front-loaded DMRS only | N1 | Symbols | 3 | 4.5 | 9(FR1) |
| Front-loaded DMRS only + additional DMRS | N1 | Symbols | [13] | [13] | [20] |

Further, K1 may denote the number of slots from a slot of a PDSCH to a slot of corresponding HARQ-ACK transmission. FIG. 9 illustrates an example of HARQ-ACK timing K1.

In FIG. 9, K0 denotes the number of slots from a slot with DL grant PDCCH to a slot with corresponding PDSCH transmission, and K2 denotes the number of slots from a slot with UL grant PDCCH to a slot with corresponding PUSCH transmission. That is, K0, K1, and K2 may be arranged briefly as in Table 8 below.

TABLE 8

| | A | B |
|---|---|---|
| K0 | DL scheduling DCI | Corresponding DL data transmission |
| K1 | DL data reception | Corresponding HARQ-ACK |
| K2 | UL scheduling DCI | Corresponding UL data transmission |

Slot timing between A and B is indicated by a field of DCI from a set of the values. Further, NR supports a different minimum HARQ processing time between UEs. The HARQ processing time includes a delay between DL data reception timing and corresponding HARQ-ACK transmission timing and a delay between UL grant reception timing and corresponding UL data transmission timing. A UE transmits a capability of its minimum HARQ processing time to a base station. An asynchronous and adaptive DL HARQ is supported in at least enhanced Mobile Broadband (eMBB) and ultra-reliable low latency (URLLC).

From a UE perspective, in a time domain, HARQ ACK/NACK feedback for multiple DL transmissions may be transmitted in one UL data/control region. Timing between DL data reception and corresponding positive acknowledgement is indicated by a field within DCI from a set of values, and the set of values is configured by higher layer. The timing is defined for a case where at least the timing is not known to the UE.

-HARQ-ACK Codebook

In NR standard, two schemes, i.e., a Type-1 HARQ-ACK codebook and a Type-2 HARQ-ACK codebook are supported. Each codebook scheme is summarized as below.

In the case of the Type-1 HARQ-ACK codebook, an HARQ-ACK codebook (i.e., a set of HARQ information bits) is defined for one or one or more candidate PDSCH reception capable of transmitting HARQ-ACK information to a PUCCH/PUSCH to be transmitted in a specific slot (e.g., an n-th slot (slot #n)). Even when actual PDSCH transmission not performed, a bit(s) for the corresponding PDSCH reception may be defined within the HARQ-ACK codebook. In a case where the UE recognizes that the PDSCH transmission is not transmitted as (including a case where PDCCH detection is unsuccessful), the NACK is defined to be transmitted.

For a single occasion for a candidate PDSCH reception, the HARQ-ACK information may be constituted by 1 bit or 2 bits according to a value of "maxNrofCodeWordsScheduledByDCI" which is a higher layer parameter representing a maximum codeword (CW) number. When "harq-ACK-SpatialBundlingPUCCH" is configured to the UE, the HARQ-ACK information may be constituted by 1 bit.

Specifically, there is an occasion of the candidate PDSCH reception as a response to a PDCCH having DCI format 1_1, and in a case where "maxNrofCodeWordsScheduledByDCI" indicates reception of 2 transport block, when the UE receives a PDSCH including one transport block, i) if "harq-ACK-SpatialBundlingPUCCH" is not configured, the UE may generate HARQ-ACK information related to a first transport block and an NACK for a second transport block, and ii) if "harq-ACK-SpatialBundlingPUCCH" is configured, the UE may generate the HARQ-ACK information as an ACK for the second transport block.

In the case of the Type-2 HARQ-ACK codebook, a codebook to transmit the HARQ-ACK information to the same PUCCH/PUSCH is defined based on a counter downlink assignment indicator (C-DAI) and/or total DAI (T-DAI) value indicated in actually transmitted PDCCH. That is, the codebook is constituted based on PDCCH information actually transmitted to the UE. When the UE fails to specific PDCCH detection, the UE transmits NACK to a bit for the corresponding PDCCH among bits defined within the codebook. In this case, the UE may recognize whether PDCCH detection is unsuccessful through C-DAI and T-DAI values.

A value of a C-DAI field in a DCI format represents an accumulative number of {serving cell, PDCCH monitoring occasion}-pair(s) of a PDSCH reception or an SPS PDSCH release related to the DCI format in which even a current serving cell and a current PDCCH monitoring occasion exist. Here, an ascending order of a serving cell index is followed and next, the ascending order of the PDCCH monitoring occasion is followed. A value of the T-DAI in the DCI format represents a total number of {serving cell, PDCCH monitoring occasion}-pair(s) of the PDSCH reception or the SPS PDSCH release related to the DCI format in which even the current PDCCH monitoring occasion exists.

As a method for configuring the HARQ-ACK codebook considering the multi-TRP transmission, (i) a joint HARQ-ACK codebook and (ii) a separated HARQ-ACK codebook scheme may be considered.

First, the joint HARQ-ACK codebook (or joint ACK/NACK codebook) may mean a method for configuring each HARQ ACK information for different TRPs as one codebook. Since this method may reduce PUCCH resources TDMed in an intra/inter slot, resource utilization may be increased.

Specifically, some kind of index (e.g., CORESETPoolIndex) which may mean different TRPs may be configured in each CORESET, and when different indexes are configured in different CORESETs, the UE may assume that different CORESETs correspond to different TRPs. For example, when a first CORESET in which CORESETPoolIndex is 0 and a second CORESET in which CORESETPoolIndex is 1 are configured to the UE, the UE may assume that the first CORERSET and the second CORESET correspond to different TRPs, respectively (i.e., multiple TRP operations). In this case, when the joint HARQ-ACK codebook is configured/indicated, the HARQ-ACK information for respective PDSCHs scheduled by different PDCCHs received through the CORESETs corresponding to different TRPs may be transmitted to a specific TRP through the same uplink resource (e.g., PUSCCH, PUSCH, etc.) corresponding to the specific TRP.

Second, the separated HARQ-ACK codebook (or separated ACK/NACK codebook) may mean a method for configuring HARQ ACK information for different TRPs as different codebooks. This method may prevent a problem in that transmission of the joint HARQ-ACK codebook is unsuccessful in an environment with a blockage probability, and as a result, all HARQ-ACK information (i.e., ACK/NACK information) is lost.

Specifically, some kind of index (e.g., CORESETPoolIndex) which may mean different TRPs may be configured in each CORESET, and when different indexes are configured in different CORESETs, the UE may assume that different CORESETs correspond to different TRPs. For example, when a first CORESET in which CORESETPoolIndex is 0 and a second CORESET in which CORESETPoolIndex is 1 are configured to the UE, the UE may assume that the first CORERSET and the second CORESET correspond to different TRPs, respectively (i.e., multiple TRP operations). In this case, when the separated HARQ-ACK codebook is configured/indicated, the HARQ-ACK information for respective PDSCHs scheduled by different PDCCHs received through the CORESETs corresponding to different TRPs may be transmitted to respective TRPs through different uplink resources (e.g., PUSCCH, PUSCH, etc.) corresponding to the different TRPs.

Further, the BS may configure, to the UE, a specific codebook scheme (i.e., the joint HARQ-ACK codebook or the separated HARQ-ACK codebook) dynamically or semi-statically.

Multiple Transmission and Reception Point (TRP)-Related Operation

The coordinated multi point (COMP) technique is a scheme in a plurality of base stations exchange (e.g., use X2 interface) or utilize channel information (e.g., RI/CQI/PMI/LI, etc.) fed back from the user equipment (UE) to perform cooperative transmission with the UE, thereby effectively controlling interference. According to the scheme used, the cooperative transmission may be divided into joint transmission (JT), coordinated scheduling (CS), coordinated beamforming (CB), dynamic point selection (DPS), dynamic point blacking (DPB), and the like.

Non-coherent joint transmission (NCJT) may refer to cooperative transmission that does not consider interference (that is, with no interference). For example, the NCJT may be a scheme in which a base station(s) transmits data to one UE through multiple TRPs by using the same time resource and frequency resource. In this scheme, the multiple TRPs of the base station(s) may be configured to transmit data to UE through different layers by using different demodulation reference signal (DMRS) ports. In other words, the NCJT may correspond to a transmission scheme in which transmission of a MIMO layer(s) from two or more TRPs is performed without adaptive precoding between the TRPs.

The NCJT may be categorized into fully overlapped NCJT, in which time and frequency resources used for transmission by each base station (or TRP) are fully overlapped, and partially overlapped NCJT, in which time and frequency resources used for transmission by each base station (or TRP) are partially overlapped. This is only for convenience of explanation in the present disclosure, and it is needless to say that, in the embodiments and methods to be described below, the above-mentioned terms can be replaced with other terms with the same technical meanings. For example, in the case of partially overlapped NCJT, both data of a first base station (e.g., TRP 1) and data of a second base station (e.g., TRP 2) may be transmitted in some of the time resources and/or frequency resources, and data of only one of the first and second base stations may be transmitted in the remaining time resources and/or frequency resources.

TRP transmits data scheduling information to an NCJT receiving UE as DCI (Downlink Control Information). From the perspective of downlink control information (DCI) transmission, M-TRP (multiple TRP) transmission may be divided into i) M-DCI (multiple DCI) based M-TRP transmission in which each TRP transmits a different DCI and ii) S-DCI (single DCI) based M-TRP transmission in which one TRP transmits DCI.

Firstly, the single DCI based MTRP scheme will be described. In the single DCI based MTRP scheme in which a representative TRP transmits scheduling information for data transmitted by itself and data transmitted by another TRP through one DCI, MTRPs cooperatively transmit one common PDSCH and each TRP participating in the cooperative transmission spatially divides the corresponding PDSCH into different layers (i.e., different DMRS ports). In other words, MTRPs transmit one PDSCH but each TRP transmits only some of multiple layers of the PDSCH. For example, when 4-layer data is transmitted, TRP 1 transmits 2 layers, and TRP 2 transmits the remaining 2 layers to the UE.

In this case, scheduling information for the PDSCH is indicated to the UE through one DCI, and the corresponding DCI indicates which DMRS port uses information of which QCL RS and QCL type (which is different from conventionally indicating the QCL RS and TYPE that are commonly applied to all DMRS ports indicated by the DCI). That is, M TCI states (M=2 for 2 TRP cooperative transmission) are indicated through the TCI field in the DCI, and the QCL RS and type are identified by using M TCI states which are different for M DMRS port groups. Also, DMRS port information may be indicated by using a new DMRS table.

As an example, in the case of the S-DCI, since all scheduling information for data transmitted by M TRPs should be delivered through one DCI, the S-DCI may be used in an ideal backhaul (BH) environment in which two TRPs may be dynamically coordinated with each other.

Secondly, the multiple DCI based MTRP method will be described. MTRPs transmit different DCIs and PDSCHs, respectively (the UE receives N DCIs and N PDSCHs from N TRPs), and the corresponding PDSCHs are transmitted by (partially or wholly) overlapping on different time resources. The corresponding PDSCHs are transmitted through different scrambling IDs, and the corresponding DCIs may be transmitted through Coresets belonging to different Coreset groups (A coreset group may be identified as an index defined in the coreset configuration of each Coreset. For example, if Coresets 1 and 2 are set to index=0 and Coresets 3 and 4 are set to index=1, Coresets 1 and 2 belong to Coreset group 0 and Coresets 3 and 4 belong to Coreset group 1. If no index is defined for a coreset, this may be interpreted as index=0). If multiple scrambling IDs are set in one serving cell or two or more coreset groups are set, the UE may know that data is received by multiple DCI-based MTRP operation.

For example, the single DCI based MTRP scheme or the multiple DCI based MTRP scheme may be indicated to the UE via separate signaling. As an example, when a plurality of CRS patterns are indicated to the UE for MTRP operation for one serving cell, PDSCH rate matching for CRS may be different depending on this MTRP operation is a single DCI based MTRP operation or a multiple DCI based MTRP operation.

The base station described in this disclosure may be a generic term for an object that transmits/receives data to and from UE. For example, the base station described herein may be a concept including one or more transmission points (TPs), one or more transmission and reception points (TRPs), and the like. For example, multiple TPs and/or multiple TRPs described herein may be included in one base station or included in multiple base stations. In addition, the TP and/or TRP may include a panel of a base station, a transmission and reception unit, and the like.

In addition, the TRP described in this disclosure means an antenna array having one or more antenna elements available in a network located at a specific geographical location in a specific area. Although this disclosure is described with respect to "TRP" for convenience of explanation, the TRP may be replaced with a base station, a transmission point (TP), a cell (e.g., a macro cell/small cell/pico cell, etc.), an antenna array, or a panel and understood and applied as such.

In addition, the CORESET group ID described in this disclosure may refer to an index/identification information (e.g., ID)/indicator, etc. for distinguishing a CORESET configured for/associated with each TRP/panel (or for each TRP/panel). In addition, the CORESET group may be a group/union of CORESETs which is distinguished by the index/identification information (e.g., ID) for distinguishing the CORESET and the CORESET group ID. For example, the CORESET group ID may be specific index information defined in the CORESET configuration. For example, the CORESET group may be configured/indicated/defined by an index defined in the CORESET configuration for each CORESET. The CORESET group ID may be configured/indicated via higher layer signaling (e.g., RRC signaling)/L2 signaling (e.g., MAC-CE)/L1 signaling (e.g., DCI).

For example, ControlResourceSet information element (IE) that is a higher layer parameter is used to configure a time/frequency control resource set (CORESET). For example, the control resource set may be related to detection and reception of downlink control information. Examples of the ControlResourceSet IE may include CORESET related ID (e.g., controlResourceSetID), an index of a CORESET pool for CORESET (e.g., CORESETPoolIndex), time/frequency resource configuration of CORESET, and TCI information related to CORESET. For example, the index of the CORESET pool (e.g., CORESETPoolIndex) may be set to 0 or 1.

For example, it may be indicated/configured so that PDCCH detection for each TRP/panel is performed on a per CORESET group basis. And/or, it may be indicated/configured so that uplink control information (e.g. CSI, HARQ-A/N, SR) and/or uplink physical channel resources (e.g. PUCCH/PRACH/SRS resources) for each TRP/panel are divided on a per CORESET group basis and managed/controlled. And/or, HARQ A/N (process/retransmission) for PDSCH/PUSCH, etc. scheduled for each TRP/panel may be managed on a per CORESET group basis.

M-TRP Transmission Scheme

M-TRP transmission by which multiple (e.g., M) TRPs transmit data to one user equipment (UE) may be divided into two main types of transmission: eMBB M-TRP transmission (or M-TRP eMMB) which is a scheme for increasing a transmission rate and URLLC M-TRP transmission (or M-TRP URLLC) which is a scheme for increasing a reception success rate and reducing latency.

URLLC M-TRP may mean that M-TRPs transmit the same TB (Transport Block) using different resources (e.g., layers/time resources/frequency resources, etc.). A number of TCI state(s) may be indicated by DCI to a UE configured with the URLLC M-TRP transmission scheme, and data received using the QCL reference signal (RS) of each TCI state may be assumed to be the same TB. On the other hand, eMBB M-TRP may mean that M-TRPs transmit different TBs using different resources (e.g., layers/time resources/frequency resources, etc.). A number of TCI state(s) may be indicated by DCI to a UE configured with the eMBB M-TRP transmission scheme, and data received using the QCL RS of each TCI state may be assumed to be different TBs. In relation to at least eMBB M-TRP, each TCI code point within DCI may correspond to 1 or 2 TCI states. If 2 TCI states are activated within one TCI code point, each TCI state for at least DMRS type 1 may correspond to one CDM group.

For example, the UE may decide/determine whether the corresponding M-TRP transmission is URLLC transmission or eMBB transmission since it uses the RNTI configured for MTRP-URLLC and the RNTI configured for MTRP-eMBB, separately. That is, if the CRC masking of the DCI received by the UE is performed using the RNTI configured for the MTRP-URLLC purpose, this may correspond to URLLC transmission, and if the CRC masking of the DCI is performed using the RNTI configured for the MTRP-eMBB purpose, this may correspond to eMBB transmission.

Further, the URLLC M-TRP transmission scheme may include an SDM based scheme, a TDM based scheme, an FDM based scheme, etc., to be described below. The UE may be configured even for detailed schemes (e.g., SDM/FDM/TDM) of the URLLC M-TRP transmission scheme. For example, a higher layer parameter (e.g., repetitionScheme) for this may be defined, and one of the SDM, FDM, or TDM scheme may be configured through the corresponding parameter. The UE may recognize that the same TB is transmitted from the M-TRP by using different layers/times/frequencies based on the configured scheme.

Table 9 shows various schemes that can be considered for URLLC M-TRP transmission. Referring to Table 9, there exist various schemes such as SDM/FDM/TDM.

TABLE 9

To facilitate further down-selection for one or more schemes in RAN1#96bis, schemes for multi-TRP based URLLC, scheduled by single DCI at least, are clarified as following:
Scheme 1 (SDM): n (n <= $N_s$) TCI states within the single slot, with overlapped time and frequency resource allocation
Scheme 1a:
Each transmission occasion is a layer or a set of layers of the same TB, with each layer or layer set is associated with one TCI and one set of DMRS port(s).
Single codeword with one RV is used across all spatial layers or layer sets. From the UE perspective, different coded bits are mapped to different layers or layer sets with the same mapping rule as in Rel-15.
Scheme 1b:
Each transmission occasion is a layer or a set of layers of the same TB, with each layer or layer set is associated with one TCI and one set of DMRS port(s).
Single codeword with one RV is used for each spatial layer or layer set. The RVs corresponding to each spatial layer or layer set can be the same or different.

TABLE 9-continued

Scheme 1c:
One transmission occasion is one layer of the same TB with one DMRS port associated with multiple TCI state indices, or one layer of the same TB with multiple DMRS ports associated with multiple TCI state indices one by one.
For Scheme 1a and 1c, the same MCS is applied for all layers or layer sets.
For scheme 1b, same or different MCS/modulation orders for different layers or layer sets can be discussed.
Scheme 2 (FDM): n (n <= $N_f$) TCI states within the single slot, with non-overlapped frequency resource allocation
Each non-overlapped frequency resource allocation is associated with one TCI state.
Same single/multiple DMRS port(s) are associated with all non-overlapped frequency resource allocations.
Scheme 2a:
Single codeword with one RV is used across full resource allocation. From UE perspective, the common RB mapping (codeword to layer mapping) is applied across full resource allocation.
Scheme 2b:
Single codeword with one RV is used for each non-overlapped frequency resource allocation.
The RVs corresponding to each non-overlapped frequency resource allocation can be the same or different.
For scheme 2a, same MCS is applied for all non-overlapped frequency resource allocations
For scheme 2b, same or different MCS/modulation orders for different non-overlapped frequency resource allocations can be discussed.
Details of frequency resource allocation mechanism for FDM 2a/2b with regarding to allocation granularity, time domain allocation can be discussed.
Scheme 3 (TDM): n (n <= $N_{t1}$) TCI states within the single slot, with non-overlapped time resource allocation
Each transmission occasion of the TB has one TCI and one RV with the time granularity of mini-slot.
All transmission occasion (s) within the slot use a common MCS with same single or multiple DMRS port(s).
RV/TCI state can be same or different among transmission occasions.
FFS channel estimation interpolation across mini-slots with the same TCI index
Scheme 4 (TDM): n (n <= $N_{t2}$) TCI states with K (n <= K) different slots.
Each transmission occasion of the TB has one TCI and one RV.
All transmission occasion (s) across K slots use a common MCS with same single or multiple DMRS port(s)
RV/TCI state can be same or different among transmission occasions.
FFS channel estimation interpolation across slots with the same TCI index
Note that M-TRP/panel based URLLC schemes shall be compared in terms of improved reliability, efficiency, and specification impact.
Note: Support of number of layers per TRP may be discussed Method for Improving Reliability in Multi-TRPs FIG. 10 illustrates an example of a transmission/reception method for improving reliability supported by a plurality of TRPs, and the following two methods may be considered.

The example in (a) of FIG. 10 shows that a layer group transmitting the same codeword (CW)/transport block (TB) correspond to different TRPs. That is, the same CW may be transmitted via different layers/layer groups. In this case, a layer group may refer to some kind of layer set made up of one or more layers. As such, the amount of transmission resources increases as the number of layers increases, and this is advantageous in that robust channel coding with a low code rate can be used for TB. In addition, it is expected that the reliability of received signals may be improved based on diversity gain due to different channels from a plurality of TRPs.

The example in (b) of FIG. 10 shows an example in which different CWs are transmitted via layer groups corresponding to different TRPs. That is, different CWs may be transmitted through different layers/layer groups. In this case, it may be assumed that TBs corresponding to the first CW (CW #1) and the second CW (CW #2) are the same. Therefore, this can be seen as an example of repeated transmission of the same TB. In the case of (b) of FIG. 10, the code rate corresponding to the TB may be higher than that of (a) of FIG. 9. Still, there is an advantage that a code rate can be adjusted by indicating different redundancy version (RV) values for encoding bits generated from the same TB according to a channel environment, or that a modulation order of each CW may be adjusted.

In (a) of FIG. 10 or (b) of FIG. 10, the same TB is repeatedly transmitted via different layer groups, and each layer group is transmitted by different TRPs/panels, thereby increasing the data reception probability, which may be called spatial division multiplexing (SDM)-based URLLC M-TRP transmission. A layer(s) belonging to different layer groups are transmitted through DMRS ports belonging to different DMRS CDM groups, respectively.

In addition, although the above description regarding multiple TRPs has been given with respect to a spatial division multiplexing (SDM) scheme using different layers, it also may be extensively applied to a frequency division multiplexing (FDM) scheme based on different frequency domain resources (e.g., RB/PRB (set)), and/or a time division multiplexing (TDM) scheme based on different time domain resources (e.g., slots, symbols, and sub-symbols).

For example, the TDM based URLLC M-TRP operation may include i) a scheme (e.g., scheme 4) of transmitting the TB in one slot by one TRP and ii) a scheme (e.g., scheme 3) of transmitting the TB through multiple OFDM symbols (i.e., a symbol group) by one TRP. In scheme i) above, there is an effect that a data reception probability may be increased through the same TB received from multiple TRPs in multiple slots. In the case of scheme ii) above, multiple TRPs may transmit the same TB may through different symbol groups in one slot.

For example, when the above description is extensively applied to a frequency division multiplexing (FDM) scheme based on different frequency domain resources (e.g., RB/PRB (set)), the operation may be performed as in the following example. This may be an operation when the FDM scheme is configured through a higher layer parameter (e.g., repetitionScheme). Different frequency domain resources may correspond to different TRPs. Further, different frequency domain resources may mean that resource regions corresponding to the respective TRPs do not overlap in the frequency domain.

As an example, the same CW/TB may be transmitted through different frequency domain resources (e.g., RB/PRB (set)). Alternatively, as an example, a plurality of CWs (e.g., CW #1/CW #e2) corresponding to the same TB may also be transmitted through different frequency domain resources (e.g., RB/PRB (set)). This may be regarded as an example of repeated transmission of the same TB. The UE which is configured with a plurality of TCI states through the DCI may receive data (e.g., CW/TB) by using a QCL RS of each TCI state, and assume that the received data is the same TB.

Hereinafter, in the present disclosure, methods which may be proposed will be described when coordinated transmission (e.g., NCJT) between multiple BSs (e.g., multiple TPs/TPRs of one or more BSs) and the UE in the wireless communication system is considered. Specifically, Proposal 1 proposes a method for scheduling by using DCI format 1_0 in multiple DCI based M-TRP transmission. Proposal 2 proposes a method for configuring the SPS PDSCH in the multiple DCI based M-TRP transmission. Proposal 3 proposes a method for assigning an HARQ process ID which does not overlap for each TRP by considering SPS transmission of multiple TRPs.

As described above, each TRP may be classified based on the index (e.g., CORESETPoolIndex) (alternatively, CORESET group ID) configured in the CORESET. The methods described in the present disclosure are described based on one or more TPs/TRPs of the BS(s), but the corresponding methods may be applied even to transmission based on one or more panels of the BS(s) in the same or similar scheme, of course.

<Proposal 1>

In DM-RS reception procedure related contents in Section 5.1.6.2 of 3GPP TS 38.214, in the case of receiving the PDSCH scheduled by DCI format 1_0, the UE is defined to perform assumption as in Table 10 in order to receive the DMRS.

Example 1) When ideal backhaul and/or the joint HARQ-ACK codebook are/is assumed between different TRPs, the UE may assume that the assumption of Table 10 is valid as it is. Additionally, when there is the PDSCH scheduled by DCI format 1_0, the UE may assume that there is no PDSCH and/or DMRS port(s) scheduled through another DCI (e.g., DCI format 1_0 and/or DCI format 1_1) in a symbol overlapped with the corresponding PDSCH.

For example, the joint HARQ-ACK codebook scheme may be configured to the UE, and when the UE receives the PDSCH scheduled by DCI format 1_0, the UE may assume that the DMRS of configuration type 1 is transmitted/received on the DMRS port 1000. Further, the UE may assume that there is no PDSCH and/or DMRS port scheduled by the DCI transmitted from another TRP in the symbol overlapped with the PDSCH scheduled by DCI format 1_0.

When the UE may make an assumption as in Example 1, the UE which may support the multiple DCI based multiple TRP transmission may also assume that the NCJT is not performed in a symbol(s) in which the PDSCH scheduled by DCI format 1_0. Accordingly, the UE may assume that only the PDSCH scheduled by DCI format 1_0 is transmitted without considering an ambiguity which may occur when decoding of the DCI transmitted in the specific TRP is unsuccessful, i.e., whether the PDSCH scheduled by another DCI is transmitted or not transmitted to the symbol(s) to which the PDSCH scheduled by DCI format 1_0 is transmitted. Accordingly, since the UE may not perform blind detection (BD) for a DMRS port(s) which may as interference which may be scheduled by another DCI, the complexity of the UE may be reduced, and the BS may not generate an interference signal which may influence the PDSCH transmitted to the UE.

Example 2) When the ideal backhaul and/or the separated HARQ-ACK codebook are/is assumed between different TRPs, three following situations may be considered.

Example 2-1) Even when the ideal backhaul and/or the separated HARQ-ACK codebook are/is assumed between different TRPs, the UE may assume that the assumption shown in Table 10 is valid as it is. Additionally, when there is the PDSCH scheduled by DCI format 1_0, the UE may assume that there is no PDSCH and/or DMRS port(s)

TABLE 10

When receiving PDSCH scheduled by DCI format 1_0 or receiving PDSCH before dedicated higher layer configuration of any of the parameters dmrs-AdditionalPosition, maxLength and dmrs-Type, the UE shall assume that the PDSCH is not present in any symbol carrying DM-RS except for PDSCH with allocation duration of 2 symbols with PDSCH mapping type B (described in clause 7.4.1.1.2 of [4, TS 38.211]), and a single symbol front-loaded DM-RS of configuration type 1 on DM-RS port 1000 is transmitted, and that all the remaining orthogonal antenna ports are not associated with transmission of PDSCH to another UE and in addition Referring to Table 10, when the UE is scheduled with the PDSCH through DCI format 1_0, the DMRS port 1000 of DMRS configuration type 1 may be assumed, and it may be assumed that a DMRS port other than the DMRS port 1000 is not allocated to another UE.

Proposal 1 of the present disclosure proposes a method for scheduling by using DCI format 1_0 in the multiple DCI based M-TRP transmission so that the assumption of Table 10 may be valid even in the multiple DCI based M-TRP transmission. Methods of Examples 1 and 2 described below may be considered so that the assumption of Table 10 may be valid even in the multiple DCI based M-TRP transmission.

scheduled through another DCI (e.g., DCI format 1_0 and/or DCI format 1_1) in a symbol overlapped with the corresponding PDSCH.

For example, the separated HARQ-ACK codebook scheme may be configured to the UE, and when the UE receives the PDSCH scheduled by DCI format 1_0, the UE may assume that the DMRS of configuration type 1 is transmitted/received on the DMRS port 1000. Further, the UE may assume that there is no PDSCH and/or DMRS port scheduled by the DCI transmitted from another TRP in the symbol overlapped with the PDSCH scheduled by DCI format 1_0.

The assumption of Example 2-1 may be applied to a case where different TRPs may not perform different PDSCH transmission in the same symbol(s) through a previous appointment. For example, TRP 2 also already knows the resource region in which the PDSCH may be scheduled through DCI format 1_0 in TRP 1, and TRP 2 should not be able to schedule the PDSCH to the corresponding resource region through DCI format 1_0. However, in this case, since TRP 2 may not perform PDSCH transmission in the previously appointed resource region, there is a disadvantage that efficiency of resource use may deteriorate as much.

Example 2-2) Even when the ideal backhaul and/or the separated HARQ-ACK codebook are/is assumed between different TRPs, the UE may assume that the assumption shown in Table 10 is valid as it is. Additionally, when there is the PDSCH scheduled by DCI format 1_0, the UE may assume that there is no DMRS port(s) scheduled through another DCI (e.g., DCI format 1_0 and/or DCI format 1_1) in a symbol overlapped with the corresponding PDSCH, more specifically, DMRS port(s) included in the same CDM group as the DMRS port scheduled through DCI format 1_0.

For example, the separated HARQ-ACK codebook scheme may be configured to the UE, and when the UE receives the PDSCH scheduled by DCI format 1_0, the UE may assume that the DMRS of configuration type 1 is transmitted/received on the DMRS port 1000. Further, the UE may assume the DMRS port(s) included in the same CDM group as the DMRS port scheduled through DCI format 1_0 is not scheduled by the DCI transmitted form another TRP in the symbol overlapped with the PDSCH scheduled by DCI format 1_0.

Through the assumption of Example 2-2, when the PDSCH is scheduled through DCI format 1_0, the UE may assume that there is no DMRS port(s) scheduled through another DCI in the same CDM group as the DMRS port scheduled through DCI format 1_0. Accordingly, since the BD for the interference DMRS port may not be performed in the corresponding CDM group, the UE complexity may be reduced. Meanwhile, the DMRS port(s) may be scheduled through another DCI in another CDM group other than the CDM group. Through this, the degree of freedom for PDSCH scheduling of different TRPs may be increased.

Example 2-3) Even when the ideal backhaul and/or the separated HARQ-ACK codebook are/is assumed between different TRPs, the UE may assume that the assumption shown in Table 10 is valid as it is. Additionally, when the BS schedules the PDSCH by DCI format 1_0, a scheduled DMRS port index may be determined according to the CORESET and/or search space in which the DCI is transmitted. More specifically, according to a specific value configured in the CORESET and/or the search space, a DMRS port of a lowest index of a CDM group corresponding to the corresponding value may be scheduled.

For example, the separated HARQ-ACK codebook scheme may be configured to the UE, and when the UE receives the PDSCH scheduled by DCI format 1_0, the UE may assume that the DMRS of configuration type 1 is transmitted/received on the DMRS port 1000. Further, the UE may determine which DMRS port is scheduled based on a specific value (e.g., a higher layer signaling index) configured in the CORESET and/or search space in which DCI format 1_0.

When the multiple DCI based M-TRP transmission is assumed, a case where each TRP intends to arbitrarily schedule the PDSCH without being influenced by the PDSCH scheduling of another TRP may be assumed. Further, the use of DCI format 1_0 may be considered in order to schedule the PDSCH. However, since only DMRS port 0 may be scheduled in the case of DCI format 1_0 in a current standard, a problem in that the DMRS port is overlapped occurs when different PDSCHs are scheduled to the same symbol(s) through DCI format 1_0 in different TRPs.

Accordingly, in order to increase the degree of freedom of the PDSCH scheduling between different TRPs in the multiple DCI based M-TRP transmission, the assumption shown in Example 2-3 described above my be used. That is, even when the PDSCH is scheduled by DCI format 1_0, the scheduled DMRS port index may be determined according to the CORESET and/or search space in which the DCI is transmitted. To this end, according to the specific value configured in the CORESET and/or the search space, the DMRS port of a lowest index of the CDM group corresponding to the corresponding value may be scheduled.

In Example 2-3, the DMRS port of the lowest index of the specific CDM group is proposed, but this is just an example, and does not limit a technical scope of the present disclosure. Accordingly, a specific DMRS port of the specific CDM group may be configured between the BS and the UE through a fixed rule and/or signaling.

In Example 2-3, as an example of the specific value configured in the CORESET and/or search space, a specific index for identifying the separated HARQ-ACK codebook may be used.

Specifically, for separated ACK/NACK feedbacks for the PDSCHs received from different TRPs, the UE may generate a separated ACK/NACK codebook identified by the specific index. The specific index may be an index configured for each TRP. For example, the specific index may mean a higher layer signaling index, a CORESET group ID, etc. As an example, the higher layer signaling index may be configured for each CORESET.

For example, the higher layer signaling index configured for each CORESET may be configured in each of the CORESET and/or the search space. As an example, the higher layer signaling index may be CORESET group ID/CORESETPoolIndex. A scheduled specific DMRS port (e.g., the DMRS port of the lowest index) may be determined based on the CDM group corresponding to the higher layer signaling index configured in the CORESET and/or search space in which DCI format 1_0 for scheduling the PDSCH.

As a specific example, higher layer signaling indexes corresponding to 0 and 1 may be configured in CORESET 1 and CORESET 2, respectively. In this case, when DCI format 1_0 is received from CORESET 1 corresponding to higher layer signaling index (e.g., CoresetPoolIndex) 0, it may be assumed that DMRS port 0 which is the DMRS port of the lowest index of CDM group 0 is scheduled. On the contrary, when DCI format 1_0 is received from CORESET 2 corresponding to higher layer signaling index (e.g., CoresetPoolIndex) 2, it may be assumed that DMRS port 2 which is the DMRS port of the lowest index of CDM group 1 is scheduled.

Through the proposal methods and/or embodiments of Proposal 1, in the multiple DCI based M-TRP transmission, at least one of the M-TRPs may schedule the PDSCH by using DCI format 1_0. Further, the proposal methods and/or embodiments of Proposal 1 described above may be each applied independently or applied in a form of a combination of two or more methods and/or embodiments.

<Proposal 2>

In a 5G NR standard, a related higher layer parameter (e.g., SPS-Config) may be defined in order to a semi-persistent scheduling (SPS) PDSCH, and an activation/deactivation instruction may be given through a layer 1 (L1)

signaling (e.g., MAC CE/DCI) so as to perform the SPS PDSCH according to the corresponding parameter.

SPS-Config IE configured through the higher layer signaling is used for configuring downlink semi-persistent transmission. Table 11 illustrates an example of SPS-Config IE defined in TS 38.331.

TABLE 11

| SPS-Config information element |
| --- |
| -- ASN1START |
| -- TAG-SPS-CONFIG-START |
| SPS-Config ::=                    SEQUENCE { |
|    periodicity                       ENUMERATED {ms10, ms20, ms32, ms40, ms64, ms80, ms128, ms160, ms320, ms640, |
|                                    spare6, spare5, spare4, spare3, spare2, spare1}, |
|    nrofHARQ-Processes               INTEGER (1 .. 8), |
|    n1PUCCH-AN                       PUCCH-ResourceId OPTIONAL, -- Need M |
|    mcs-Table                        ENUMERATED {qam64LowSE} OPTIONAL, -- Need S |
|    . . . |
| } |
| -- TAG-SPS-CONFIG-STOP |
| -- ASN1STOP |

Referring to Table 11, the SPS-Config IE includes parameters such as 'periodicity', 'nrofHARQ-Processes', 'n1PUCCH-AN', 'mcs-Table', etc. The 'periodicity' parameter indicates a periodicity for the downlink (DL) SPS. The 'nrofHARQ-Processes' parameter indicates the number of HARQ processes configured for the DL SPS. The 'n1PUCCH-AN' parameter indicates HARQ resources for the PUCCH for the DL SPS. The network configures the corresponding resource to format 0 or format 1. An actual PUCCH resource is configured in PUCCH-Config and is referenced as the ID. The 'mcs-Table' parameter indicates an MCS table used for the DL SPS by the UE.

Further, a CN-RNTI for activation, deactivation, and retransmission may be configured through RRC. For example, when information scrambled with the CS-RNTI is received through the DCI, SPS transmission may be activated.

Meanwhile, since the SPS PDSCH is designated by considering only single TRP transmission in the current standard, it is difficult to support multiple TRP transmission. Accordingly, Proposal 2 of the present disclosure proposes a method for configuring the SPS PDSCH in the multiple DCI based M-TRP transmission.

Figure 11:
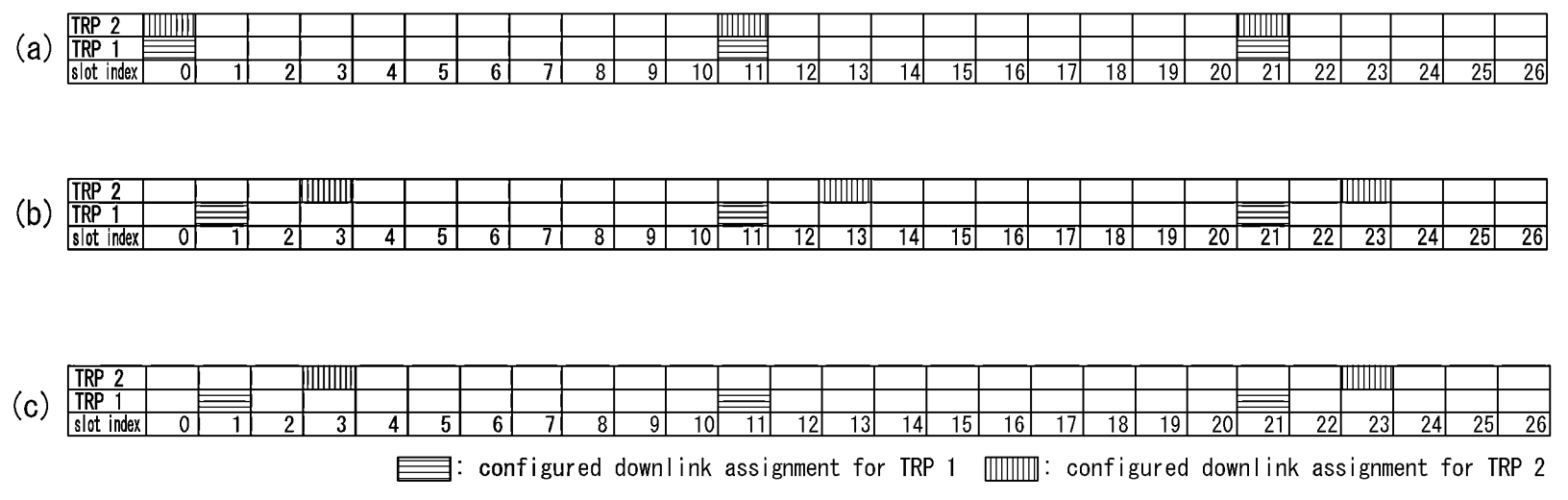

FIG. 11 illustrates an example of SPS PDSCH transmission performed by multiple TRPs (hereinafter, referred to as M-TRP). FIG. 11 is just one example for convenience of the description and does not limit the technical scope of the present disclosure. In FIG. 11, a situation in which 2 TRPs (e.g., TRP 1 and TRP 2) transmit the SPS PDSCH is assumed and described for convenience of description, but the present disclosure may also be applied to a case where 3 or more TRPs operate, of course.

FIG. 11(a) illustrates an example of SPS PDSCH transmission using the same time resource in different TRPs. TRP 1 and TRP 2 may transmit the SPS PDSCH in slot 1, slot 11, and slot 21. In this case, an activation/deactivation indication of the DL SPS to TRP 1 and TRP may be commonly applied.

FIG. 11(b) illustrates an example of SPS PDSCH transmission based on the same time resource configuration in different TRPs, and in which activation/deactivation is independent using the same time resource in different TRPs. As an example, time resources for TRP 1 and TRP 2 are configured in slot 1 and slot 3, but only the SPS PDSCH for TRP 1 may be activated in slot 1 and only the SPS PDSCH for TRP 2 may be activated in slot 3.

FIG. 11(c) illustrates an example of SPS PDSCH transmission based on an independent time resource configuration, and in which both the activation and the deactivation are independent. The time resources for the SPS PDSCHs may be individually configured for each of TRP 1 and TRP 2, and the activation/deactivation for the DL SPS may also be indicated for each of TRP 1 and TRP 2.

The following method may be considered in order to perform the SPS PDSCH by considering the multiple TRP (M-TRP) transmission.

In the present disclosure, 'case of considering M-TRP transmission' may mean a case where different higher layer signaling indexes are configured in different CORESETs to the UE. The higher layer signaling index may be an index for distinguishing the TRP, and may be a concept corresponding to CORESET group ID/CORESETPoolIndex. For example, when a first CORESET in which the higher layer signaling index (e.g., CORESETPoolIndex) is configured to 0 and a second CORESET in which the higher layer signaling index (e.g., CORESETPoolIndex) is configured to 1 are configured to the UE, the UE may appreciate that the M-TRP transmission, i.e., downlink transmission from 2 or more TRPs is performed.

The description of 'case of considering M-TRP transmission' may also be applied to Methods 1 to 3 of Proposal 2 to be described below.

Method 1) When the M-TRP transmission is considered, the activation/deactivation indication for the SPS PDSCH may be performed for each TRP, and a configuration value (e.g., SPS-Config) for the SPS PDSCH may be based on the same configuration value.

'Performing activation/deactivation indication for the SPS PDSCH for each TRP' may mean performing activation/deactivation instructions for different SPS PDSCHs through the CORESETs in which different higher layer signaling indexes (e.g., CoresetPoolindex) are configured. For example, the UE may receive DCI (e.g., first DCI) corresponding to a specific CS-RNTI (configured scheduling RNTI) through the CORESET in which the higher layer signaling index (e.g., CoresetPoolIndex) 0 is configured and receive another DCI (e.g., second DCI) corresponding to the CS-RNTI (configured scheduling RNTI) through the CORESET in which the higher layer signaling index (e.g., CoresetPoolIndex) 1 is configured. In this case, the DCIs corresponding to different higher layer signaling indexes may be interpreted as the activation/deactivation instructions corresponding to different TRPs.

In other words, the UE may receive (i) first DCI from the first CORESET in which the value of CORESETPoolIndex is configured to 0 and (ii) receive second DCI from the second CORESET in which the value of CORESETPoolIndex is configured to 1. The UE may receive information indicating activation of the SPS PDSCH transmission from at least one of the first DCI or the second DCI. First DCI based SPS activation information may be interpreted as activating the SPS PDSCH of TRP 1 and second DCI based SPS activation information may be interpreted as activating the SPS PDSCH of TRP 2.

The activated SPS PDSCH may be different for each TRP, but the configuration value for the SPS PDSCH may be equally applied. For example, the parameters included in SPS-Config described in Table 11 ma be applied to activated SPS transmission. As an example, both the SPS PDSCH of TRP 1 and the SPS PDSCH of TRP 2 may be activated based on the first DCI and the second DCI, and the SPS PDSCHs may be received based on the same SPS-Config configuration.

Method 2) When the M-TRP transmission is considered, the activation/deactivation indication for the SPS PDSCH may be performed for each TRP, and an SPS PDSCH configuration value to be actually applied may follow a configuration value corresponding to a TRP related to the activation/deactivation indication. The configuration value (e.g., SPS-Config) for the SPS PDSCH may be defined for each TRP.

As described above, 'performing activation/deactivation indication for the SPS PDSCH for each TRP' may mean performing activation/deactivation instructions for different SPS PDSCHs through the CORESETs in which different higher layer signaling indexes are configured. For example, the UE may receive DCI (e.g., first DCI) corresponding to a specific CS-RNTI (configured scheduling RNTI) through the CORESET in which the higher layer signaling index 0 is configured and receive another DCI (e.g., second DCI) corresponding to the CS-RNTI (configured scheduling RNTI) through the CORESET in which the higher layer signaling index 1 is configured. In this case, the DCIs corresponding to different higher layer signaling indexes may be interpreted as the activation/deactivation instructions corresponding to different TRPs.

In other words, the UE may receive (i) first DCI from the first CORESET in which the value of CORESETPoolIndex is configured to 0 and (ii) receive second DCI from the second CORESET in which the value of CORESETPoolIndex is configured to 1. The UE may receive information indicating activation of the SPS PDSCH transmission from at least one of the first DCI or the second DCI. First DCI based SPS activation information may be interpreted as activating the SPS PDSCH of TRP 1 and second DCI based SPS activation information may be interpreted as activating the SPS PDSCH of TRP 2.

Further, an SPS PDSCH configuration value (e.g., SPS-Config) to be actually applied to the activated SPS PDSCH may vary depending on the TRP related to the activation/deactivation indication. That is, a plurality of configuration values (e.g., SPS-Config) for the SPS PDSCH may be configured, and the configuration value to be applied to the actual SPS PDSCH transmission may be determined depending on the TRP related to the activation/deactivation indication.

For example, the configuration value (e.g., SPS-Config) for the SPS PDSCH may be configured for different TRPs. As an example, SPS-Config1 and SPS-Config2 may be each configured, and may correspond to hither layer signaling index 0 and higher layer signaling index 1, respectively. That is, SPS-Config1 may correspond to the CORESET related to higher layer signaling index 0 and SPS-Config2 may correspond to the CORESET related to higher layer signaling index 1. To this end, a parameter for representing the TRP corresponding to the configuration value for the SPS PDSCH, e.g., the higher layer signaling index may also be included. When the UE receives the DCI corresponding to the specific CS-RNTI through the CORESET in which higher layer signaling index 0 is configured, the UE may follow the configuration value of SPS-Config1 corresponding to higher layer signaling index 0. On the contrary, when the UE receives the DCI corresponding to the specific CS-RNTI through the CORESET in which higher layer signaling index 1 is configured, the UE may follow the configuration value of SPS-Config2 corresponding to higher layer signaling index 1.

For example, configuration values (e.g., SPS-Config) for a plurality of SPS PDSCHs may be configured, and the UE may receive the information indicating the activation for the SPS PDSCH transmission. The indicating the activation for the SPS PDSCH transmission may be delivered through the DCI scrambled by the CS-RNTI. At least one of the plurality of configuration values may be activated based on the DCI. An activated specific configuration value (e.g., SPS-Config) may be applied to the SPS PDSCH related to the higher layer signaling index (e.g., CoresetPoolIndex) configured in the CORESET which receives the DCI.

The activation/deactivation of the SPS PDSCH transmission for each TRP may be configured/indicated for each TRP through Method 2 described above, and SPS configurations (e.g., SPS-Config) to be applied to the SPS PDSCHs transmitted from different TRPs may also be configured/indicated differently for each TRP.

Method 3) When the ideal backhaul and/or the joint HARQ-ACK codebook may be assumed, the activation/deactivation indication corresponding to the specific TRP may be interpreted as an indication for all TRPs.

A plurality of CORESETs in which different higher layer signaling indexes (e.g., CoresetPoolIndex) are configured may be configured to the UE. That is, the higher layer signaling indexes corresponding to respective CORESETs may be configured differently. The specific TRP may be interpreted as a specific higher layer signaling index in Method 3, and the UE may receive the SPS PDSCHs from all TRPs according to the activation/deactivation indication based on the DCI through the CORESET corresponding to the specific higher layer signaling index.

For example, the specific higher layer signaling index representing the specific TRP may become one specific index of multiple indexes. The specific higher layer signaling index may be predefined according to a fixed rule or a specific index may be signaled from the BS.

Method 3 may also be applied to Method 1 and/or Method 2 described above.

For example, different higher layer signaling indexes may be configured in different CORESETs configured to the UE. The UE may receive the DCI corresponding to the specific CS-RNTI through the CORESET corresponding to the specific higher layer signaling index. The UE may perform the SPS PDSCH according to an SPS PDSCH configuration value preconfigured according to the activation/deactivation indication through the DCI. In this case, when different TRPs have the same configuration value (e.g., Method 1), the UE may perform the SPS PDSCH according to the same configuration value and when different TRPs have different configuration values (e.g., Method 2), the UE may perform the SPS PDSCH according to different configuration values.

Through the proposal methods and/or embodiments of Proposal 2 described above, in the multiple DCI based M-TRP transmission, the configuration and/or activation indication for the SPS transmission may be performed for each TRP, and the UE may receive the SPS PDSCHs from the plurality of TRPs. Further, the proposal methods and/or embodiments of Proposal 2 described above may be each applied independently or applied in a form of a combination of two or more methods and/or embodiments.

<Proposal 3>

Meanwhile, when the SPS PDSCH is activated and transmitted, an HARQ process ID for each PDSCH transmitted according to the SPS PDSCH configuration may be determined as in Table 12. Table 12 illustrates contents related to an HARQ process ID determining method defined in TS38.321.

TABLE 12

For configured downlink assignments, the HARQ Process ID associated with the slot where the DL transmission starts is derived from the following equation:
HARQ Process ID = [floor (CURRENT_slot × 10 / (numberOfSlotsPerFrame × periodicity))] modulo nrofHARQProcesses
where CURRENT_slot = [(SFN × numberOfSlotsPerFrame) + slot number in the frame] and numberOfSlotsPerFrame refers to the number of consecutive slots per frame as specified in TS 38.211 [8].

In Table 12, the periodicity value and the nrofHARQProcesses value used for determining the HARQ process ID are included in 'SPS-Config' which is the higher layer parameter.

When the M-TRP based SPS PDSCH is transmitted, an HARQ process ID which is not overlapped should be able to be allocated to SPS transmission of different TRPs. To this end, the following proposal method may be applied.

Proposal 3-1) When the same higher layer configuration is applied to the transmission of the SPS PDSCHs corresponding to different TRPs, i.e., when SPS downlink transmission is performed in different TRPs based on the same SPS-Config, a method for defining the HARQ process ID for each TRP is proposed.

Equations 3 to 6 illustrate an example of the method for defining the HARQ process ID for each TRP when the SPS downlink transmission is performed based on the same SPS-Config in different TRPs. A single method for applying the feature of the present disclosure is not limited to Equations 3 to 6, and some may be changed to another equation within a scope which may be appreciated by those skilled in the art, of course.

In Equations 3 to 6, CURRENT_slot may be defined as [(SFN×numberOfSlotsPerFrame)+slot number in the frame] similarly as defined in Table 12 above. Here, 'numberOfSlotsPerFrame' represents the number of consecutive slots for each frame.

In Equation 3, HARQ process ID 1 represents the HARQ process ID for TRP 1 and HARQ process ID 2 represents an HARQ process ID for TRP 2.

HARQ Process ID 1=[floor(CURRENT_slot×10/(numberOfSlotsPerFrame×periodicity))]modulo nrofHARQProcesses, HARQ Process ID 2=[floor(CURRENT_slot×10/(numberOfSlotsPerFrame×periodicity))]modulo nrofHARQProcesses+nrofHARQProcesses   [Equation 3]

As another example, it may be considered that a half of nrofHARQProcesses configured in SPS_Config is mapped to each TRP in order to prevent an occupation amount of the HARQ process ID from being increased in the M-TRP based SPS PDSCH transmission. In this case, HARQ process ID 1 for TRP 1 and HARQ process ID 2 for TRP 2 may be represented in as in Equation 4.

HARQ Process ID1=[floor(CURRENT_slot×10/(numberOfSlotsPerFrame×periodicity))]modulo (nrofHARQProcesses/2), HARQ Process ID2={[floor(CURRENT_slot×10/(numberOfSlotsPerFrame×periodicity))]modulo (nrofHARQProcesses/2)}+(nrofHARQProcesses/2)   [Equation 4]

In Equations 3 and 4, it can be seen that HARQ process ID 2 may be calculated by adding a specific offset value (e.g., nrofHARQProcesses or nrofHARQProcesses/2) to the value of HARQ process ID 2. It is apparent that it is possible that in Equations 3 and 4, equations of HARQ process ID 1 and HARQ process ID 2 are applied in an opposite order.

In Equations 3 and 4, an example of defining the HARQ process IDs for two TRPs is primarily described, but the present disclosure may also be extensively applied to a case where 3 or more TRPs perform the NCJT, of course.

Further, since different higher layer signaling indexes (e.g., CoresetPoolIndex) may be configured in different CORESETs in order to distinguish different TRPs, a method for defining the HARQ process ID by considering the higher layer signaling index may also be considered. Equations 5 and 6 illustrate an example of defining the HARQ process IDs for different TRPs based on the higher layer signaling index configured for each CORESET.

HARQ Process ID_k=[floor(CURRENT_slot×10/(numberOfSlotsPerFrame×periodicity))]modulo nrofHARQProcesses+(k*nrofHARQProcesses)   [Equation 5]

HARQ Process ID_k=[floor(CURRENT_slot×10/(numberOfSlotsPerFrame×periodicity))]modulo (nrofHARQProcesses/x)+(k*(nrofHARQProcesses/x))   [Equation 6]

In Equations 5 and 6, HARQ Process ID_k means the HARQ process ID corresponding to higher layer signaling index k. That is, HARQ Process ID_k may mean the HARQ process ID for the TRP related to higher layer signaling index k. In Equations 5 and 6, k may represent the higher layer signaling index, and may be a positive integer including 0. As an example, k may correspond to CORESET-PoolIndex. In Equation 6, x represents the number of different k values or the number of TRPs.

Equation 5 illustrates an example of applying k*nrofHARQProcesses as the offset value and Equation 6 illustrates an example applying k*(nrofHARQProcesses/x) as the offset value. That is, Equation 6 means evenly distributing and mapping nrofHARQProcesses configured in SPS-config for each TRP in order to prevent the occupation amount of the HARQ process ID from being increased in the M-TRP based SPS PDSCH transmission as in Equation 4 described above.

Further, in the examples of Equations 5 and 6, it is assumed that k starts from 0, and the examples are changeable to (k−a)*nrofHARQProcesses according to a start value of k. a is s a value which may be determined according to the start value of k, and a may be equal to the start value of k. As an example, when the start value of k is 0, 1, and 2, a may become 0, 1, and 2 for the start values, respectively.

The examples of Equations 3 to 6 of Proposal 3-1 described above have a feature that ranges in which different HARQ process ID 1 and HARQ process ID 2 may be determined are not overlapped with each other. To this ed, in the above example, one specific HARQ process ID of two HARQ process IDs may be defined in a value other than specific values which may be determined as other HARQ process IDs. That is, the HARQ process ID 2 is defined to be larger than a maximum value which may be configured in HARQ process ID 1.

Proposal 3-2) A method for defining the HARQ process ID for each TRP when different higher layer configurations are applied to the transmission of the SPS PDSCHs corresponding to different TRPs, i.e., when the SPS transmission is performed based on different SPS-config-1 and SPS-config-2 is described.

Equations 7 to 9 illustrate an example of the method for defining the HARQ process ID for each TRP when the SPS downlink transmission is performed based on different SPS-Configs in different TRPs. A single method for applying the feature of the present disclosure is not limited to Equations 7 to 9, and some may be changed to another equation within a scope which may be appreciated by those skilled in the art, of course.

In Equations 7 to 9, CURRENT_slot may be defined as [(SFN×numberOfSlotsPerFrame)+slot number in the frame] similarly as defined in Table 12 above. Here, 'numberOfSlotsPerFrame' represents the number of consecutive slots for each frame.

HARQ Process $ID1=[\text{floor}(\text{CURRENT\_slot} \times 10/(\text{numberOfSlotsPerFrame} \times \text{periodicity1}))] \text{modulo nrofHARQProcesses1}$, HARQ Process $ID2=[\text{floor}(\text{CURRENT\_slot} \times 10/(\text{numberOfSlotsPerFrame} \times \text{periodicity2}))] \text{modulo nrofHARQProcesses2+nrofHARQProcesses1}$ [Equation 7]

In Equation 7, HARQ process ID 1 represents the HARQ process ID for TRP 1 and HARQ process ID 2 represents an HARQ process ID for TRP 2. Further, in Equation 7, periodicityk and nrofHARQProcessesk represent a periodicity value and a nrofHARQProcesses value included in an SPS PDSCH configuration value corresponding to a k-th TRP. That is, periodicityk and nrofHARQProcessesk may mean the periodicity value and the nrofHARQProcesses value included in the SPS PDSCH configuration value corresponding to higher layer signaling index k.

It is apparent that it is possible that in Equation 7, equations of HARQ process ID 1 and HARQ process ID 2 are applied in an opposite order. Further, in Equation 7, an example of defining the HARQ process IDs for two TRPs is primarily described, but the present disclosure may also be extensively applied to a case where 3 or more TRPs perform the NCJT, of course.

Further, since different higher layer signaling indexes (e.g., CoresetPoolIndex) may be configured in different CORESETs in order to distinguish different TRPs, a method for defining the HARQ process ID by considering the higher layer signaling index may also be considered. Equations 8 and 9 illustrate an example of defining the HARQ process IDs for different TRPs based on the higher layer signaling index configured for each CORESET.

HARQ Process $ID\_k=[\text{floor}(\text{CURRENT\_slot} \times 10/(\text{numberOfSlotsPerFrame} \times \text{periodityk}))] \text{modulo nrofHARQProcessesk+nrofHARQProcesses}(k \bmod X)$ [Equation 8]

In Equation 8, HARQ Process ID_k means the HARQ process ID corresponding to higher layer signaling index k. That is, HARQ Process ID_k may mean the HARQ process ID for the TRP related to higher layer signaling index k. periodicityk and nrofHARQProcessesk represent a periodicity value and the number of HARQ processes configured through the SPS PDSCH configuration value corresponding to higher layer signaling index k, respectively. Further, X represents a total number of different higher layer signaling indexes k configured to the UE, and kmodX represents a modulo operation of k and X.

HARQ Process $ID\_k=[\text{floor}(\text{CURRENT\_slot} \times 10/(\text{numberOfSlotsPerFrame} \times \text{periodicityk}))] \text{modulo nrofHARQProcessesk} + \sum_{n=0}^{k-1} \text{nrofHARQProcesses}_n$ [Equation 9]

In Equation 9, HARQ Process ID_k means the HARQ process ID corresponding to higher layer signaling index k. That is, HARQ Process ID_k may mean the HARQ process ID for the TRP related to higher layer signaling index k. periodicityk and nrofHARQProcessesk represent a periodicity value and the number of HARQ processes configured through the SPS PDSCH configuration value corresponding to higher layer signaling index k, respectively.

The examples of Equations 7 to 9 of Proposal 3-2 described above have a feature that ranges in which different HARQ process ID 1 and HARQ process ID 2 may be determined are not overlapped with each other. To this ed, in the above example, one specific HARQ process ID of two HARQ process IDs may be defined in a value other than specific values which may be determined as other HARQ process IDs. That is, the HARQ process ID 2 is defined to be larger than a maximum value which may be configured in HARQ process ID 1.

Through the method of Proposal 3 described above, an HARQ process ID which may be distinguished for each TRP, i.e., is not overlapped may be configured/defined.

<FIG. 12>

FIG. 12 illustrates signaling when the UE receives multiple DCIs (i.e., when each TRP transmits the DCI to the UE) in a situation of M-TRP (alternatively, M-cells, hereinafter, all TRPs may be replaced with the cells or even when multiple CORESETs (/CORESET groups) are configured from one TRP, the corresponding TRP may be assumed as M-TRP). FIG. 12 is just for convenience of the description and does not limit the technical scope of the present disclosure.

In the following description, the network side is described based on "TRP", but as described above, "TRP" may be replaced with expressions including a panel, an antenna array, a cell (e.g., macro cell/small cell/pico cell), a transmission point (TP), a base station (gNB, etc.), etc., and applied. Further, as described above, the TRP may be distinguished according to information (e.g., an index or ID) on a CORESET group (or CORESET pool). As an example, when one UE is configured to perform transmission/reception with multiple TRPs (or cells), this may mean that multiple CORESET groups (or CORESET pools) are configured for one UE. The configuration for the CORESET group (or CORESET pool) may be performed through the higher layer signaling (e.g., RRC signaling).

Referring to FIG. 12, for convenience of the description, signaling between two TRPs and the UE is considered, but the corresponding signaling scheme may be extensively applied even to signaling between multiple TRPs and multiple UEs. In the following description, the network side may be one base station including a plurality of TRPs, and may be one cell including the plurality of TRPs. As an example, ideal/non-ideal backhaul may also be configured between TRP 1 and TRP 2 constituting the network side. Further, the following description is made based on multiple TRPs, but this may be extensively applied even to transmission through multiple panels in the same manner. In addition, in the present disclosure, an operation of the UE receiving a signal TRP1/TRP2 may be construed/described even as an operation of the UE receiving the signal from the network side (through/using TRP1/2) (or may be an operation), and an operation of the UE transmitting the signal to TRP1/TRP2 may be construed/described even as an operation of the UE transmitting the signal to the network side (through/using TRP1/TRP2) (or may be an operation), and reversely construed/described.

The UE may receive configuration information for multiple TRP based transmission and reception from the network side through/using TRP1 (and/or TRP2) (S1205). That is, the network side may transmit configuration information related to multiple TRP based transmission and reception to the UE through/using TRP 1 (and/or TRP 2) (S1205). The configuration information may include resource information related to a configuration (i.e., TRP configuration) of the network side, resource information (resource allocation) related to the multiple TRP based transmission and reception, etc. The configuration information may be transferred through higher layer signaling (e.g., RRC signaling, MAC-CE, etc.). Further, when the configuration information is previously defined or configured, the corresponding step may also be skipped.

For example, the configuration information may include CORESET related configuration information (e.g., ControlResourceSet IE) as described in the methods (e.g., Proposal 1/Proposal 2/Proposal 3, etc.). The CORESET related configuration information may include ID (e.g., controlResourceSetID) related to the CORESET, an index (e.g., CORESETPoolindex) of a CORESET pool for the CORESET, a time/frequency resource configuration of the CORESET, TCI information related to the CORESET, etc. The index (e.g., CORESETPoolIndex) of the CORESET pool may mean a specific index (e.g., CORESET group Index, HARQ Codebook index) mapped/configured to each CORESET.

For example, the configuration information may also include configurations related to the joint HARQ-ACK codebook or the separated HARQ-ACK codebook described in the methods (e.g., Proposal 1/Proposal 2/Proposal 3, etc.). For example, the configuration information may include a parameter (e.g., ackNackFeedbackMode) for configuring the HARQ-ACK codebook scheme, and the joint HARQ-ACK codebook or the separated HARQ-ACK codebook may be indicated through the parameter.

For example, the configuration information may include the SPS related configuration (e.g., SPS-Config IE) described in the methods (e.g., Proposal 1/Proposal 2/Proposal 3, etc.). The SPS related configuration (e.g., SPS-Config IE) may also include periodicity information (e.g., periodicity) for a downlink (DL) SPS, the number of HARQ processes (e.g., nrofHARQ-Processes) configured for the DL SPS, HARQ resource information (e.g., n1PUCCH-AN) for the PUCCH for the DL SPS, MCS information (e.g., mcs-Table), etc.

For example, the configuration information may also include configurations related to PDCCH/PDSCH/PUCCH/PUSCH, etc., as described in the methods (e.g., Proposal 1/Proposal 2/Proposal 3, etc.).

For example, the operation of the UE (reference numeral 100/200 in FIGS. 15 to 19) which receives the multiple TRP based transmission and reception related configuration information from the network side (reference numeral 100/200 in FIGS. 15 to 19) in step S1205 described above may be implemented by devices in FIGS. 15 to 19 to be described below. For example, referring to FIG. 16, one or more processors 102 may control one or more transceivers 106 and/or one or more memories 104 so as to receive the multiple TRP based transmission and reception related configuration information, and one or more transceivers 106 may receive configuration information and one or more transceivers 106 may receive the multiple TRP based transmission and reception related configuration information from the network side.

Likewise, the operation of the network side (100/200 in FIGS. 15 to 19) which transmits the multiple TRP based transmission and reception related configuration information to the UE (100/200 in FIGS. 15 to 19) in step S1205 described above may be implemented by the devices in FIGS. 15 to 19 to be described below. For example, referring to FIG. 16, one or more processors 102 may control one or more transceivers 106 and/or one or more memories 104 so as to transmit the multiple TRP based transmission and reception related configuration information, and one or more transceivers 106 may receive configuration information and one or more transceivers 106 may transmit the multiple TRP based transmission and reception related configuration information from the network side.

The UE may receive, from the network side, DCI 1 and Data 1 scheduled by corresponding DCI 1 through/using TRP 1 (S1210-1). Further, the UE may transmit, to the network side, DCI 2 and Data 2 scheduled by corresponding DCI 2 through/using TRP 2 (S1210-2). That is, the network side may transmit, to the UE, DCI 1 and Data 1 scheduled by corresponding DCI through/using TRP 1 (S1210-1). Further, the network side may transmit, to the UE, DCI 2 and Data 2 scheduled by corresponding DCI 2 through/using TRP 2 (S1210-2). For example, DCI (e.g., DCI 1, DCI 2) and Data (e.g., Data 1, Data 2) may be transferred through a control channel (e.g., PDCCH, etc.) and a data channel (e.g., PDSCH, etc.), respectively. Further, steps S1210-1 and S1210-2 may be simultaneously performed or any one may be performed earlier than the other one.

For example, DCI 1 and/or DCI 2 may include scheduling information for the PDSCH for transmission/reception of Data 1 and/or Data 2. For example, DCI 1 and/or DCI 2 may be detected/received in a CORESET in which a specific index (e.g., CORESETPoolIndex) is mapped/configured as described in the above-described method (e.g., Proposal 1/Proposal 2/Proposal 3, etc.).

For example, DCI 1 and/or DCI 2 may use DCI format 1_0. For example, the UE may operate according to Proposal 1 described above based on the PDSCH scheduled by DCI format 1_0. For example, the SPS PDSCH may be activated based on DCI 1 and/or DCI 2. For example, DCI 1 and/or DCI 2 may include HARQ process ID information.

For example, the operation of the UE (100/200 in FIGS. 15 to 19) which receives DCI 1 and/or DCI 2 and/or Data 1 and/or Data 2 from the network side (100/200 in FIGS. 15 to 19) in step S1210-1/S1210-2 described above may be implemented by the devices in FIGS. 15 to 19 to be described below. For example, referring to FIG. 16, one or more processor 102 may control one or more transceivers 106 and/or one or more memories 104 to receive DCI 1 and/or DCI 2 and/or Data 1 and/or Data 2, and one or more transceivers 106 may receive, from the network side, DCI 1 and/or DCI 2 and/or Data 1 and/or Data 2.

Likewise, the operation of the network side (100/200 in FIGS. 15 to 19) which transmits DCI 1 and/or DCI 2 and/or Data 1 and/or Data 2 to the UE (100/200 in FIGS. 15 to 19) in step S1210-1/S1210-2 described above may be implemented by the devices in FIGS. 15 to 19 to be described below. For example, referring to FIG. 16, one or more processor 102 may control one or more transceivers 106 and/or one or more memories 104 to transmit DCI 1 and/or DCI 2 and/or Data 1 and/or Data 2, and one or more transceivers 106 may transmit, to the UE, DCI 1 and/DCI 2 and/or Data 1 and/or Data 2.

The UE may decode Data 1 and Data 2 received from TRP 1 and TRP 2 (S1215). For example, the UE may perform channel estimation and/or decoding for data based on the method (e.g., Proposal 1/Proposal 2/Proposal 3, etc.).

For example, the operation of the UE (e.g., reference numeral 100/200 of FIGS. 15 to 19) which decodes Data 1 and Data 2 in step S1215 described above may be implemented by the devices of FIGS. 15 to 19 to be described below. For example, referring to FIG. 16, one or more processor 102 may control one or more memories 104 to perform the operation of decoding Data 1 and Data 2.

The UE may transmit HARQ-ACK information (e.g., ACK information, NACK information, etc.) for the DCI and/or Data 1 and/or Data 2 above to the network side through/using TRP 1 and/or TRP 2 through one or more PUCCH(s) based on the proposed method (e.g., Proposal 1/Proposal 2/Proposal 3/Proposal 4, etc.) (S1220-1 and S1220-2). That is, the network side may receive, from the UE, HARQ-ACK information (e.g., ACK information, NACK information, etc.) for the DCI and/or Data 1 and/or Data 2 above through/using TRP 1 and/or TRP 2 through one or more PUCCH(s) based on the proposed method (e.g., Proposal 1/Proposal 2/Proposal 3, etc.) (S1220-1 and S1220-2).

For example, the HARQ-ACK information for Data 1 and/or Data 2 may be combined into one or separated. Further, the UE may be configured to transmit only HARQ-ACK information to representative TRP (e.g., TRP 1), and transmission of the HARQ-ACK information to the other TRP (e.g., TRP 2) may also be omitted.

For example, the HARQ-ACK information may be constituted by the joint HARQ-ACK codebook or the separated HARQ-ACK codebook described in the above-described methods (e.g., Proposal 1/Proposal 2/Proposal 3, etc.). For example, the HARQ-ACK information may be configured as the joint HARQ-ACK codebook/separated HARQ-ACK codebook based on an index relationship/order mapped to (or configured in) the CORESET. For example, the HARQ-ACK information may be transmitted through the PUCCH and/or the PUSCH.

For example, the operation of the UE (100/200 in FIGS. 15 to 19) which transmits the HARQ-ACK information for Data 1 and/or Data 2 to the network side (100/200 in FIGS. 15 to 19) through one or more PUCCHs in step S1220-1/S1220-2 described above may be implemented by the devices in FIGS. 15 to 19 to be described below. For example, referring to FIG. 16, one or more processors 102 may control one or more transceivers 106 and/or one or more memories 104 to transmit the HARQ-ACK information for Data 1 and/or Data 2 through one or more PUCCHs, and one or more transceivers 106 may transmit, to the network side, the HARQ-ACK information for Data 1 and/or Data 2.

Likewise, the operation of the network side (100/200 in FIGS. 15 to 19) which receives the HARQ-ACK information for Data 1 and/or Data 2 from the UE (100/200 in FIGS. 15 to 19) through one or more PUCCHs in step S1220-1/ S1220-2 described above may be implemented by the devices in FIGS. 15 to 19 to be described below. For example, referring to FIG. 16, one or more processors 102 may control one or more transceivers 106 and/or one or more memories 104 to receive the HARQ-ACK information for Data 1 and/or Data 2, and one or more transceivers 106 may receive, from the UE, the HARQ-ACK information for Data 1 and/or Data 2.

In FIG. 12 described above, the methods are described based on a multiple DCI based M-TRP operation is primarily described, but in some cases, the methods may be applied even to a single DCI based M-TRP operation.

<FIG. 13>

FIG. 13 illustrates an example of an operation flowchart of PDSCH reception of a UE to which methods (e.g., Proposal 1/Proposal 2/Proposal 3, etc.) proposed in the present disclosure may be applied. The UE may be supported by a plurality of TRPs, and ideal/non-ideal backhaul may be configured among the plurality of TRPs. FIG. 13 is just for convenience of the description and does not limit the scope of the present disclosure. Further, some step(s) illustrated in FIG. 13 may be omitted according to a situation and/or a configuration.

In the following description, the network side is described based on "TRP", but as described above, "TRP" may be replaced with expressions including a panel, an antenna array, a cell (e.g., macro cell/small cell/pico cell), a transmission point (TP), a base station (gNB, etc.), etc., and applied. Further, as described above, the TRP may be distinguished according to information (e.g., an index or ID) on a CORESET group (or CORESET pool). As an example, when one UE is configured to perform transmission/reception with multiple TRPs (or cells), this may mean that multiple CORESET groups (or CORESET pools) are configured for one UE. The configuration for the CORESET group (or CORESET pool) may be performed through the higher layer signaling (e.g., RRC signaling).

The UE may receive configuration information (S1310). The configuration information may be received through a higher layer signaling (e.g., RRC, etc.). For example, the configuration information may include (i) first information for configuring semi-persistent downlink transmission and (ii) second information related to control resource sets (CORESETs).

For example, the first information may correspond to the SPS related configuration (e.g., SPS-Config IE) described in the methods (e.g., Proposal 1/Proposal 2/Proposal 3, etc.). The first information may include multiple configurations related to downlink semi-persistent scheduling (SPS). In this case, the first information may include a plurality of SPS-Configs. Each of multiple configurations included in the first information may include the periodicity information (e.g. periodicity) for the downlink (DL) SPS and the number of HARQ processes (e.g., nrofHARQ-Processes) configured for the DL SPS. Further, each of multiple configurations included in the first information may include the HARQ resource information for the PUCCH for the DL SPS, the MCS information (e.g., mcs-Table), etc. For example, each of the multiple configurations included in the first information may include information related to the CORESET group index or also be configured in response to the CORESET group index.

For example, the second information may correspond to the CORESET related configuration information (e.g., ControlResourceSet IE) described in the above-described method (e.g., Proposal 1/Proposal 2/Proposal 3, etc.). The CORESET related configuration information (i.e., second information) may include ID (e.g., controlResourceSetID) related to the CORESET, an index (e.g., CORESETPoolindex) of a CORESET pool for the CORESET, a time/frequency resource configuration of the CORESET, TCI information related to the CORESET, etc. As an example, (i) a first CORESET corresponding to a first CORESET group index and (ii) a second CORESET corresponding to a second CORESET group index may be configured based on the second information.

For example, the configuration information may also include information (e.g., ackNackFeedbackMode) related to a feedback mode of the HARQ-ACK information. The information related to the feedback mode may indicate one of the joint mode or the separate mode, and the HARQ-ACK codebook may be configured based on the indicated mode. As an example, as described in the above-described method (e.g., Proposal 1/Proposal 2/Proposal 3, etc.), when the joint mode is indicated, the joint HARQ-ACK codebook may be configured and when the separate mode is indicated, the separated HARQ-ACK codebook may be configured.

For example, an operation of the UE (reference numeral 100/200 in FIGS. 15 to 19) which receives the configuration information in step S1310 described above may be implemented by the devices in FIGS. 15 to 19 to be described below. For example, referring to FIG. 16, one or more processors 102 may control one or more transceivers 106 and/or one or more memories 104 so as to transmit the configuration information and one or more transceivers 106 may receive the configuration information.

The UE may receive first downlink control information (DCI) based on the first CORESET and second DCI based on the second CORESET (S1320). CORESETPoolIndex corresponding to the CORESET which receives each DCI may be configured differently. The first DCI and the second DCI may be transmitted through a downlink control channel (e.g., PDCCH). Downlink data channel transmission may be scheduled based on the first DCI or second DCI.

For example, the first DCI or the second DCI may correspond to DCI format 1_0. Each DCI may include an HARQ process number filed, a time domain resource allocation field, a frequency domain resource allocation field, a PUCCH resource indicator (PRI) field, etc.

For example, as described in the above-described methods (e.g., (e.g., Proposal 1/Proposal 2/Proposal 3, etc.), semi-persistent downlink transmission may be activated based on at least one of the first DCI or the second DCI. In this case, the first DCI and the second DCI may be CRC-scrambled by the CS-RNTI.

For example, an operation of the UE (reference numeral 100/200 in FIGS. 15 to 19) which receives the first DCI and the second DCI in step S1320 described above may be implemented by the devices in FIGS. 15 to 19 to be described below. For example, referring to FIG. 16, one or more processors 102 may control one or more transceivers 106 and/or one or more memories 104 so as to receive the first DCI and the second DCI and one or more transceivers 106 may receive the first DCI and the second DCI.

The UE may receive a semi-persistent scheduling (SPS) PDSCH based on the activation (S1330).

For example, the semi-persistent downlink transmission may be activated by each of the first DCI and the second DCI, and a plurality of SPS PDSCHs including a first SPS PDSCH and a second SPS PDSCH may be received based thereon. As an example, the plurality of SPS PDSCHs may be overlapped and received in a time domain.

The SPS PDSCH may be related to a CORESET group index corresponding to a CORESET which receives the DCI by which the semi-persistent downlink transmission is activated. For example, first SPS PDSCH transmission may be activated based on the first DCI, and the first SPS PDSCH may be related to a first CORESET group index corresponding to a first CORESET which receives the first DCI. Further, second SPS PDSCH transmission may be activated based on the second DCI, and the second SPS PDSCH may be related to a second CORESET group index corresponding to a second CORESET which receives the second DCI.

For example, the first SPS PDSCH and the second SPS PDSCH may be received based on the same specific configuration among multiple configurations included in the first information.

As another example, a first configuration among multiple configurations included in the first information may be activated based on the first DCI, and a second configuration among multiple configurations included in the first information may be activated based on the second DCI. In this case, an SPS PDSCH related to the first CORESET group index corresponding to the first CORESET which receives the first DCI may be received based on the first configuration. Further, an SPS PDSCH related to the second CORESET group index corresponding to the second CORESET which receives the second DCI may be received based on the second configuration.

For example, an operation of the UE (reference numeral 100/200 in FIGS. 15 to 19) which receives the SPS PDSCH in step S1330 described above may be implemented by the devices in FIGS. 15 to 19 to be described below. For example, referring to FIG. 16, one or more processors 102 may control one or more transceivers 106 and/or one or more memories 104 so as to receive the SPS PDSCH and one or more transceivers 106 may receive the SPS PDSCH.

Although not illustrated in FIG. 13, the UE may also receive an HARQ process identifier (i.e., HARQ process ID) related to the SPS PDSCH. The HARQ process identifier may be included in each DCI, and received. When the plurality of SPS PDSCHs is activated based on the first DCI and the second DCI, each of a first HARQ process identifier related to the SPS PDSCH activated based on the first DCI and a second HARQ process identifier related to the SPS PDSCH activated based on the second DCI may be configured and received.

The HARQ process identifier (i.e., HARQ process ID) may be determined based on the methods described in Proposal 3 described above. Ranges of the first HARQ process identifier and the second HARQ process identifier may not be overlapped. As an example, the second HARQ process identifier may be defined to be larger than a maximum value configurable in the first HARQ process identifier.

For example, the second HARQ process identifier may be calculated by adding an offset value to the first HARQ process identifier. The offset value may be determined based on the number of HARQ processes. As an example, the second HARQ process identifier may be calculated by adding the number of HARQ processes to the first HARQ process identifier. As an example, the second HARQ process identifier may be calculated by adding (the number of HARQ processes/the number of CORESET group indexes) to the first HARQ process identifier. Here, the number of CORESET group indexes may mean the number of CORESETPoolIndexes, i.e., the number of TRPs.

For example, the HARQ process identifier may be configured based on the CORESET group index corresponding to the CORESET which receives the DCI by which the semi-persistent downlink transmission is activated.

<FIG. 14>

FIG. 14 illustrates an example of a PDSCH transmission operation flowchart of a base station (BS) performing data transmission and reception to which the methods (e.g., Proposal 1/Proposal 2/Proposal 3/Proposal 4, etc.) may be applied. FIG. 14 is just for convenience of the description and does not limit the scope of the present disclosure. Further, some step(s) illustrated in FIG. 14 may be omitted according to a situation and/or a configuration.

The BS may be a mean collecting naming an object performing transmission and reception of data with the UE. For example, the base station may be a concept including one or more transmission points (TPs), one or more transmission and reception points (TRPs), and the like. Further, the TP and/or the TRP may include a panel, transmission and reception units, and the like of the BS. Further, as described above, the TRP may be distinguished according to information (e.g., an index or ID) on a CORESET group (or CORESET pool). As an example, when one UE is configured to perform transmission/reception with multiple TRPs (or cells), this may mean that multiple CORESET groups (or CORESET pools) are configured for one UE. The configuration for the CORESET group (or CORESET pool) may be performed through the higher layer signaling (e.g., RRC signaling).

The BS may transmit, to the UE, configuration information (S1410). The configuration information may be transmitted through a higher layer signaling (e.g., RRC or MAC-CE). For example, the configuration information may include (i) first information for configuring semi-persistent downlink transmission and (ii) second information related to control resource sets (CORESETs).

For example, the first information may correspond to the SPS related configuration (e.g., SPS-Config IE) described in the methods (e.g., Proposal 1/Proposal 2/Proposal 3, etc.). The first information may include multiple configurations related to downlink semi-persistent scheduling (SPS). In this case, the first information may include a plurality of SPS-Configs. Each of multiple configurations included in the first information may include the periodicity information (e.g. periodicity) for the downlink (DL) SPS and the number of HARQ processes (e.g., nrofHARQ-Processes) configured for the DL SPS. Further, each of multiple configurations included in the first information may include the HARQ resource information for the PUCCH for the DL SPS, the MCS information (e.g., mcs-Table), etc. For example, each of the multiple configurations included in the first information may include information related to the CORESET group index or also be configured in response to the CORESET group index.

For example, the second information may correspond to the CORESET related configuration information (e.g., ControlResourceSet IE) described in the above-described method (e.g., Proposal 2/Proposal 2/Proposal 3, etc.). The CORESET related configuration information (i.e., second information) may include ID (e.g., controlResourceSetID) related to the CORESET, an index (e.g., CORESETPoolIndex) of a CORESET pool for the CORESET, a time/frequency resource configuration of the CORESET, TCI information related to the CORESET, etc. As an example, (i) a first CORESET corresponding to a first CORESET group index and (ii) a second CORESET corresponding to a second CORESET group index may be configured based on the second information.

For example, an operation of the base station (e.g., reference numeral 100 and/or 200 of FIGS. 15 to 19) which transmits the configuration information in step S1410 described above may be implemented by devices of FIGS. 15 to 19 to be described below. For example, referring to FIG. 16, one or more processors 102 may control one or more transceivers 106 and/or one or more memories 104 so as to transmit the configuration information and one or more transceivers 106 may transmit the configuration information.

The BS may transmit, to the UE, first downlink control information (DCI) based on the first CORESET and second DCI based on the second CORESET (S1420). CORESET-PoolIndex corresponding to the CORESET which transmits each DCI may be configured differently. The first DCI and the second DCI may be transmitted through a downlink control channel (e.g., PDCCH).

For example, as described in the above-described methods (e.g., (e.g., Proposal 1/Proposal 2/Proposal 3, etc.), semi-persistent downlink transmission may be activated based on at least one of the first DCI or the second DCI. In this case, the first DCI and the second DCI may be CRC-scrambled by the CS-RNTI.

For example, each of the first DCI and the second DCI may include the HARQ process identifier (i.e., HARQ process ID). When the plurality of SPS PDSCHs is activated based on the first DCI and the second DCI, each of a first HARQ process identifier related to the SPS PDSCH activated based on the first DCI and a second HARQ process identifier related to the SPS PDSCH activated based on the second DCI may be configured.

The HARQ process identifier (i.e., HARQ process ID) may be determined based on the methods described in Proposal 3 described above.

For example, the second HARQ process identifier may be calculated by adding an offset value to the first HARQ process identifier. The offset value may be determined based on the number of HARQ processes. As an example, the second HARQ process identifier may be calculated by adding the number of HARQ processes to the first HARQ process identifier. As an example, the second HARQ process identifier may be calculated by adding (the number of HARQ processes/the number of CORESET group indexes) to the first HARQ process identifier. Here, the number of CORESET group indexes may mean the number of CORESETPoolIndexes, i.e., the number of TRPs.

For example, the HARQ process identifier may be configured based on the CORESET group index corresponding to the CORESET which receives the DCI by which the semi-persistent downlink transmission is activated.

For example, an operation of the eNB (e.g., reference numeral 100/200 in FIGS. 15 to 19) which transmits the first DCI and the second DCI in step S1420 described above may be implemented by the devices in FIGS. 15 to 19 to be described below. For example, referring to FIG. 16, one or more processors 102 may control one or more transceivers 106 and/or one or more memories 104 so as to transmit the first DCI and the second DCI and one or more transceivers 106 may transmit, to the UE, the first DCI and the second DCI.

The BS may transmit a semi-persistent scheduling (SPS) PDSCH to the UE (S1430).

For example, the semi-persistent downlink transmission may be activated by each of the first DCI and the second DCI, and a plurality of SPS PDSCHs including a first SPS PDSCH and a second SPS PDSCH may be transmitted based thereon. As an example, the plurality of SPS PDSCHs may be overlapped and transmitted in a time domain.

The SPS PDSCH may be related to a CORESET group index corresponding to a CORESET which transmits the DCI by which the semi-persistent downlink transmission is activated. For example, first SPS PDSCH transmission may be activated based on the first DCI, and the first SPS PDSCH may be related to a first CORESET group index corresponding to a first CORESET in which the first DCI is transmitted. Further, second SPS PDSCH transmission may be activated based on the second DCI, and the second SPS PDSCH may be related to a second CORESET group index corresponding to a second CORESET which transmits the second DCI.

For example, a first configuration among multiple configurations included in the first information may be activated based on the first DCI, and a second configuration among multiple configurations included in the first information may be activated based on the second DCI. In this case, an SPS PDSCH related to the first CORESET group index corresponding to the first CORESET which transmits the first DCI may be transmitted based on the first configuration. Further, an SPS PDSCH related to the second CORESET group index corresponding to the second CORESET which transmits the second DCI may be transmitted based on the second configuration.

For example, an operation of the base station (e.g., reference numeral 100/200 in FIGS. 15 to 19) which transmits the SPS PDSCH in step S1430 described above may be implemented by the devices in FIGS. 15 to 19 to be described below. For example, referring to FIG. 16, one or more processors 102 may control one or more transceivers 106 and/or one or more memories 104 so as to transmit the SPS PDSCH and one or more transceivers 106 may transmit the SPS PDSCH.

The BS may receive, from the UE, HARQ-ACK information (S1440). The HARQ-ACK information may be ACK/NACK feedback information for a plurality of SPS PDSCHs received by the UE.

For example, each of HARQ-ACK information for the first SPS PDSCH related to a first CORESET group index and HARQ-ACK information for the second SPS PDSCH related to a second CORESET group index may be configured (e.g., separated HARQ-ACK codebook), and each HARQ-ACK information may be individually fed back to the BS. Alternatively, each of HARQ-ACK information for the first SPS PDSCH related to a first CORESET group index and HARQ-ACK information for the second SPS PDSCH related to a second CORESET group index may be concatenated and constituted as one HARQ-ACK information (e.g., joint HARQ-ACK codebook).

For example, an operation of the base station (e.g., reference numeral 100 and/or 200 of FIGS. 15 to 19) which receives the HARQ-ACK information in step S1440 described above may be implemented by the devices in FIGS. 15 to 19 to be described below. For example, referring to FIG. 16, one or more processors 102 may control one or more transceivers 106 and/or one or more memories 104 so as to receive the HARQ-ACK information and one or more transceivers 106 may receive the HARQ-ACK information from the UE.

As mentioned above, the network side/UE signaling and operation (e.g., Proposal 1/2/3/12, FIG. 12/13/14, etc.) may be implemented by devices (e.g., FIGS. 15 to 19) to be described below. For example, the network side (e.g., TRP 1/TRP 2) may correspond to a first wireless device and the UE may correspond to a second wireless device and in some cases, an opposite case thereto may also be considered. For example, the first device (e.g., TRP 1)/the second device (e.g., TRP 2) may correspond to the first wireless device and the UE may correspond to the second wireless device and in some cases, an opposite case thereto may also be considered.

For example, the network side/UE signaling and operation (e.g., Proposal 1/2/3/FIG. 12/13/14, etc.) may be processed by one or more processors (e.g., 102 and 202) in FIGS. 15 to 19 and the network side/UE signaling and operation (e.g., Proposal 1/2/3/FIG. 12/13/14, etc.) may be stored in one or more (e.g., 104 and 204) of FIG. 15) in the form of a command/program (e.g., instruction and executable code) for driving at least one processor (e.g., 102 and 202) in FIGS. 15 to 19.

For example, in a device comprising: one or more memories and one or more processors functionally connected to the one or more memories, the one or more processors may be configured to control the device to receive configuration information, receive control information (DCI) based on a first CORESET and second DCI based on a second CORESET based on the configuration information, and receive a semi-persistent scheduling (SPS) PDSCH. In this case, the configuration information may include (i) first information for configuring semi-persistent downlink transmission and (ii) second information related to control resource sets (CORESETs), the first information may include multiple configurations related to downlink semi-persistent scheduling (SPS), and (i) the first CORESET corresponding to a first CORESET group index and (ii) the second CORESET corresponding to a second CORESET group index may be configured based on the second information. Further, the transmission of the SPS PDSCH may be activated based on at least one of the first DCI or the second DCI, and the SPS PDSCH may be related to a CORESET group index corresponding to a CORESET which receives the DCI by which the semi-persistent downlink transmission is activated.

As another example, in one or more non-transitory computer-readable media storing one or more instructions, the one or more instructions executable by one or more processors may include instructions for instructing a user equipment (UE) to receive configuration information; receive control information (DCI) based on a first CORESET and second DCI based on a second CORESET based on the configuration information; and receive a semi-persistent scheduling (SPS) PDSCH. In this case, the configuration information may include (i) first information for configuring semi-persistent downlink transmission and (ii) second information related to control resource sets (CORESETs), the first information may include multiple configurations related to downlink semi-persistent scheduling (SPS), and (i) the first CORESET corresponding to a first CORESET group index and (ii) the second CORESET corresponding to a second CORESET group index may be configured based on the second information. Further, the transmission of the SPS PDSCH may be activated based on at least one of the first DCI or the second DCI, and the SPS PDSCH may be related to a CORESET group index corresponding to a CORESET which receives the DCI by which the semi-persistent downlink transmission is activated.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 15 illustrates a communication system applied to the present disclosure.

Referring to FIG. 15, a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Devices Applicable to the Present Disclosure

FIG. 16 illustrates wireless devices applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 1010x and the BS 200} and/or {the wireless device 1010x and the wireless device 1010x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage medium, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to Which Disclosure is Applied

FIG. 17 illustrates a signal processing circuit for a transmit signal.

Referring to FIG. 17, a signal processing circuit 2000 may include a scrambler 2010, a modulator 2020, a layer mapper 2030, a precoder 2040, a resource block mapper 2050, and a signal generator 1060. Although not limited thereto, an operation/function of FIG. 18 may be performed by the processors 102 and 202 and/or the transceivers 106 and 206 of FIG. 16. Hardware elements of FIG. 17 may be implemented in the processors 102 and 202 and/or the transceivers 106 and 206 of FIG. 16. For example, blocks 1010 to 1060 may be implemented in the processors 102 and 202 of FIG. 16. Further, blocks 1010 to 1050 may be implemented in the processors 102 and 202 of FIG. 16 and the block 2060 of FIG. 17 and the block 2060 may be implemented in the transceivers 106 and 206 of FIG. 16.

A codeword may be transformed into a radio signal via the signal processing circuit 2000 of FIG. 17. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 2010. A scramble sequence used for scrambling may be generated based on an initialization value and the initialization value may include ID information of a wireless device. The scrambled bit sequence may be modulated into a modulated symbol sequence by the modulator 2020. A modulation scheme may include pi/2-BPSK(pi/2-Binary Phase Shift Keying), m-PSK(m-Phase Shift Keying), m-QAM (m-Quadrature Amplitude Modulation), etc. A complex modulated symbol sequence may be mapped to one or more transport layers by the layer mapper 2030. Modulated symbols of each transport layer may be mapped to a corresponding antenna port(s) by the precoder 2040 (precoding). Output z of the precoder 2040 may be obtained by multiplying output y of the layer mapper 2030 by precoding matrix W of N*M. Here, N represents the number of antenna ports and M represents the number of transport layers. Here, the precoder 2040 may perform precoding after performing transform precoding (e.g., DFT transform) for complex modulated symbols. Further, the precoder 2040 may perform the precoding without performing the transform precoding.

The resource block mapper 2050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (2010 to 2060) of FIG. 17. For example, the wireless device (e.g., 100 or 200 of FIG. 16) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Present Disclosure

FIG. 18 illustrates another example of a wireless device applied to the present disclosure. The wireless device may be implemented in various forms according to a use-case/service (see FIG. 18).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 16. For example, the transceiver(s) 114 may include the one or more transceivers 106 and 106 and/or the one or more antennas 108 and 108 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 100, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 100 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to Which Disclosure is Applied

FIG. 19 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 19, a portable device 1010 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 19, respectively.

The communication unit 110 may transmit/receive a signal (e.g., data, a control signal, etc.) to/from another wireless device and eNBs. The control unit 120 may perform various operations by controlling components of the portable device 1010. The control unit 120 may include an Application Processor (AP). The memory unit 130 may store data/parameters/programs/codes/instructions required for driving the portable device 1010. Further, the memory unit 130 may store input/output data/information, etc. The power supply unit 140a may supply power to the portable device 1010 and include a wired/wireless charging circuit, a battery, and the like. The interface unit 140b may support a connection between the portable device 1010 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

Here, wireless communication technology implemented in wireless devices 100 and 200 of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally, or alternatively, the wireless communication technology implemented in the wireless devices 100 and 200 of the present disclosure may perform communication based on LTE-M technology. In this case, as an example, the LTE-M technology may be an example of the LPWAN and may be called various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. Additionally or alternatively, the wireless communication technology implemented in the wireless devices 100 and 200 of the present disclosure may includes at least one of ZigBee, Bluetooth, and Low Power Wide Area Network (LPWAN) considering the low-power communication, and is not limited to the name described above. As an example, the ZigBee technology may generate personal area networks (PAN) associated with small/low-power digital communication based on various standards including IEEE 802.15.4, and the like, and may be called various names.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL AVAILABILITY

Although the method of transmitting and receiving PDSCH in the wireless communication system of the present disclosure has been described in connection with examples in which it applies to 3GPP LTE/LTE-A system and 5G systems (new RAT systems), the method is also applicable to other various wireless communication systems.

The invention claimed is:

1. A method of receiving, by a user equipment (UE), a physical downlink shared channel (PDSCH) in a wireless communication system, the method comprising:
receiving configuration information,
the configuration information including (i) first information for configuring semi-persistent downlink transmission and (ii) second information related to control resource sets (CORESETs),
the first information including multiple configurations related to downlink semi-persistent scheduling (SPS), and
(i) a first CORESET corresponding to a first CORESET group index and (ii) a second CORESET corresponding to a second CORESET group index being configured based on the second information;
receiving first downlink control information (DCI) with DCI format 1_0 based on the first CORESET and second DCI based on the second CORESET,
the semi-persistent downlink transmission being activated based on at least one of the first DCI with DCI format 1_0 or the second DCI; and
receiving a semi-persistent scheduling (SPS) PDSCH based on the activated semi-persistent downlink transmission,
wherein the SPS PDSCH is related to at least one of the first CORESET group index and second CORESET group index corresponding to at least one of the CORESET and the second CORESET which receives at least one of the first DCI and the second DCI by which the semi-persistent downlink transmission is activated,
wherein the semi-persistent downlink transmission assumes that a demodulation reference signal (DMRS) port other than the DMRS port received through the first DCI with DCI format 1_0 is not assigned to another UE, and
wherein the semi-persistent downlink transmission assumes that a Non-Coherent Joint Transmission (NCJT) is not performed on the symbol in which in the SPS PDSCH scheduled by the first DCI with DCI format 1_0 is transmitted.

2. The method of claim 1, wherein a plurality of SPS PDSCHs including a first SPS PDSCH and a second SPS PDSCH is received based on the semi-persistent downlink transmission being based by each of the first DCI and the second DCI.

3. The method of claim 2, wherein the first SPS PDSCH is related to the first CORESET group index corresponding to the first CORESET which receives the first DCI, and
the second SPS PDSCH is related to the second CORESET group index corresponding to the second CORESET which receives the second DCI.

4. The method of claim 3, wherein the plurality of SPS PDSCHs are overlapped and received in a time domain.

5. The method of claim 3, wherein the first SPS PDSCH and the second SPS PDSCH are received based on a same specific configuration among the multiple configurations included in the first information.

6. The method of claim 2, wherein a first configuration among the multiple configurations included in the first information is activated based on the first DCI, and
a second configuration among multiple configurations included in the first information is activated based on the second DCI.

7. The method of claim 6, wherein an SPS PDSCH related to the first CORESET group index corresponding to the first CORESET which receives the first DCI is received based on the first configuration.

8. The method of claim 1, wherein each of the multiple configurations included in the first information includes information related to the CORESET group index.

9. The method of claim 1, further comprising:
receiving a Hybrid Automatic Repeat Request (HARQ) process identifier related to the SPS PDSCH.

10. The method of claim 9, wherein each of the multiple configurations included in the first information includes the number of HARQ processes and period information.

11. The method of claim 10, wherein each of a first HARQ process identifier related to the SPS PDSCH activated based on the first DCI and a second HARQ process identifier related to the SPS PDSCH activated based on the second DCI is configured and received.

12. The method of claim 11, wherein the second HARQ process identifier is calculated by adding an offset value to the first HARQ process identifier.

13. The method of claim 12, wherein the offset value is determined based on the number of HARQ processes.

14. The method of claim 9, wherein the HARQ process identifier is configured based on the CORESET group index corresponding to the CORESET which receives the DCI by which the semi-persistent downlink transmission is activated.

15. A user equipment (UE) receiving a physical downlink shared channel (PDSCH) in a wireless communication system, the UE comprising:
one or more transceivers;
one or more processors; and
one or more memories storing instructions for operations executed by the one or more processors and connected to the one or more processors,
wherein the operations include
receiving configuration information,
the configuration information including (i) first information for configuring semi-persistent downlink transmission and (ii) second information related to control resource sets (CORESETs),
the first information including multiple configurations related to downlink semi-persistent scheduling (SPS), and (i) a first CORESET corresponding to a first CORESET group index and (ii) a second CORESET corresponding to a second CORESET group index being configured based on the second information, receiving first downlink control information (DCI) with DCI format 1_0 based on the first CORESET and second DCI based on the second CORESET, the semi-persistent downlink transmission being activated based on at least one of the first DCI with DCI format 1_0 or the second DCI, and receiving a semi-persistent scheduling (SPS) PDSCH based on the activated semi-persistent downlink transmission, and wherein the SPS PDSCH is related to at least one of the first CORESET group index and second CORESET group index corresponding to at least one of the CORESET and the second CORESET which receives at least one of the first DCI and the second DCI by which the semi-persistent downlink transmission is activated, wherein the semi-persistent downlink transmission assumes that a demodulation reference signal (DMRS) port other than the DMRS port received through the first DCI with DCI format 1_0 is not assigned to another UE, and wherein the semi-persistent downlink transmission assumes that a Non-Coherent Joint Transmission (NCJT) is not performed on the symbol in which in the SPS PDSCH scheduled by the first DCI with DCI format 1_0 is transmitted.

16. A base station (BS) transmitting a physical downlink shared channel (PDSCH) in a wireless communication system, the BS comprising:

one or more transceivers;

one or more processors; and one or more memories storing instructions for operations executed by the one or more processors and connected to the one or more processors, wherein the operations include transmitting, to a user equipment (UE), configuration information, the configuration information including (i) first information for configuring semi-persistent downlink transmission and (ii) second information related to control resource sets (CORESETs), the first information including multiple configurations related to downlink semi-persistent scheduling (SPS), and (i) a first CORESET corresponding to a first CORESET group index and (ii) a second CORESET corresponding to a second CORESET group index being configured based on the second information, transmitting first downlink control information (DCI) with DCI format 1_0 based on the first CORESET and second DCI based on the second CORESET, the semi-persistent downlink transmission being activated based on at least one of the first DCI with DCI format 1_0 or the second DCI, and transmitting, to the UE, a semi-persistent scheduling (SPS) PDSCH based on the activated semi-persistent downlink transmission, and wherein the SPS PDSCH is related to at least one of the first CORESET group index and second CORESET group index corresponding to at least one of the CORESET and the second CORESET which receives at least one of the first DCI and the second DCI by which the semi-persistent downlink transmission is activated, wherein the semi-persistent downlink transmission assumes that a demodulation reference signal (DMRS) port other than the DMRS port received through the first DCI with DCI format 1_0 is not assigned to another UE, and wherein the semi-persistent downlink transmission assumes that a Non-Coherent Joint Transmission (NCJT) is not performed on the symbol in which in the SPS PDSCH scheduled by the first DCI with DCI format 1_0 is transmitted.

* * * * *